(12) United States Patent
Goto

(10) Patent No.: US 11,028,793 B2
(45) Date of Patent: Jun. 8, 2021

(54) INTERNAL COMBUSTION ENGINE CONTROL SYSTEM

(71) Applicant: DENSO CORPORATION, Kariya (JP)

(72) Inventor: Takanobu Goto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/788,659

(22) Filed: Feb. 12, 2020

(65) Prior Publication Data
US 2020/0182180 A1    Jun. 11, 2020

Related U.S. Application Data

(63) Continuation of application No. PCT/JP2018/026701, filed on Jul. 17, 2018.

(30) Foreign Application Priority Data

Aug. 30, 2017    (JP) .............................. JP2017-165954

(51) Int. Cl.
*F02D 41/04*    (2006.01)
*F02D 41/22*    (2006.01)

(52) U.S. Cl.
CPC ............ *F02D 41/04* (2013.01); *F02D 41/222* (2013.01); *F02D 2200/021* (2013.01); *F02D 2200/1004* (2013.01)

(58) Field of Classification Search
CPC ............... F02D 17/04; F02D 2200/023; F02D 2200/1004; F02D 41/04; F02D 41/1497; F02D 41/222; F02D 45/00
See application file for complete search history.

(56) References Cited

U.S. PATENT DOCUMENTS 4,531,495 A  *  7/1985  Yamato ................. F02D 41/222
                                                            123/479
2005/0000276 A1     1/2005  Bauer et al.
(Continued)

FOREIGN PATENT DOCUMENTS

JP    2001-152882    6/2001
JP    2007-291890    11/2007
(Continued)

*Primary Examiner* — Carl C Staubach
(74) *Attorney, Agent, or Firm* — Nixon & Vanderhye P.C.

(57) ABSTRACT

A control unit controls a combustion state of an internal combustion engine based on a detection value of a temperature sensor. A monitor unit calculates an estimated torque of actual torque of the internal combustion engine and calculates an engine-requested torque requested for the internal combustion engine and to monitor whether the estimated torque differs from the engine-requested torque by an amount that is more than or equal to a predetermined criterion. A detection abnormality determination unit determines whether a detection value or behavior of the detection value is abnormal. The monitor unit includes: a normal-state torque calculation unit to calculate an estimated torque by using the detection value when the detection abnormality determination unit does not determine an abnormality; and an abnormal-state torque calculation unit to calculate an estimated torque by inhibiting using of the detection value when the detection abnormality determination unit determines an abnormality.

7 Claims, 12 Drawing Sheets

(56) References Cited

U.S. PATENT DOCUMENTS

| | | | |
|---|---|---|---|
| 2016/0273975 A1 | 9/2016 | Tano et al. | |
| 2018/0038289 A1 | 2/2018 | Yanagihara et al. | |
| 2020/0165996 A1* | 5/2020 | Goto | F02D 41/22 |

FOREIGN PATENT DOCUMENTS

| | | |
|---|---|---|
| JP | 4030916 | 1/2008 |
| JP | 2010-52460 | 3/2010 |
| JP | 2014-80951 | 5/2014 |
| JP | 2015-10498 | 1/2015 |
| WO | 2019/021721 | 1/2019 |
| WO | 2019/026545 | 2/2019 |

* cited by examiner

INTERNAL COMBUSTION ENGINE CONTROL SYSTEM

CROSS REFERENCE TO RELATED APPLICATION

The present application is a continuation application of International Patent Application No. PCT/JP2018/026701 filed on Jul. 17, 2018, which designated the U.S. and claims the benefit of priority from Japanese Patent Application No. 2017-165954 filed on Aug. 30, 2017. The entire disclosures of all of the above applications are incorporated herein by reference.

TECHNICAL FIELD

The present disclosure relates to an internal combustion engine control system.

BACKGROUND

Conventionally, a control unit is employed in a control system to control combustion state of an internal combustion engine.

SUMMARY

According to an aspect of the present disclosure, an internal combustion engine control system comprises: a control unit configured to control a combustion state of an internal combustion engine based on a detection value of a temperature sensor. The internal combustion engine control system further comprises a monitor unit configured to calculate an estimated torque of the internal combustion engine and an engine-requested torque requested for the internal combustion engine. The monitor unit is further configured to monitor whether the estimated torque differs from the engine-requested torque.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
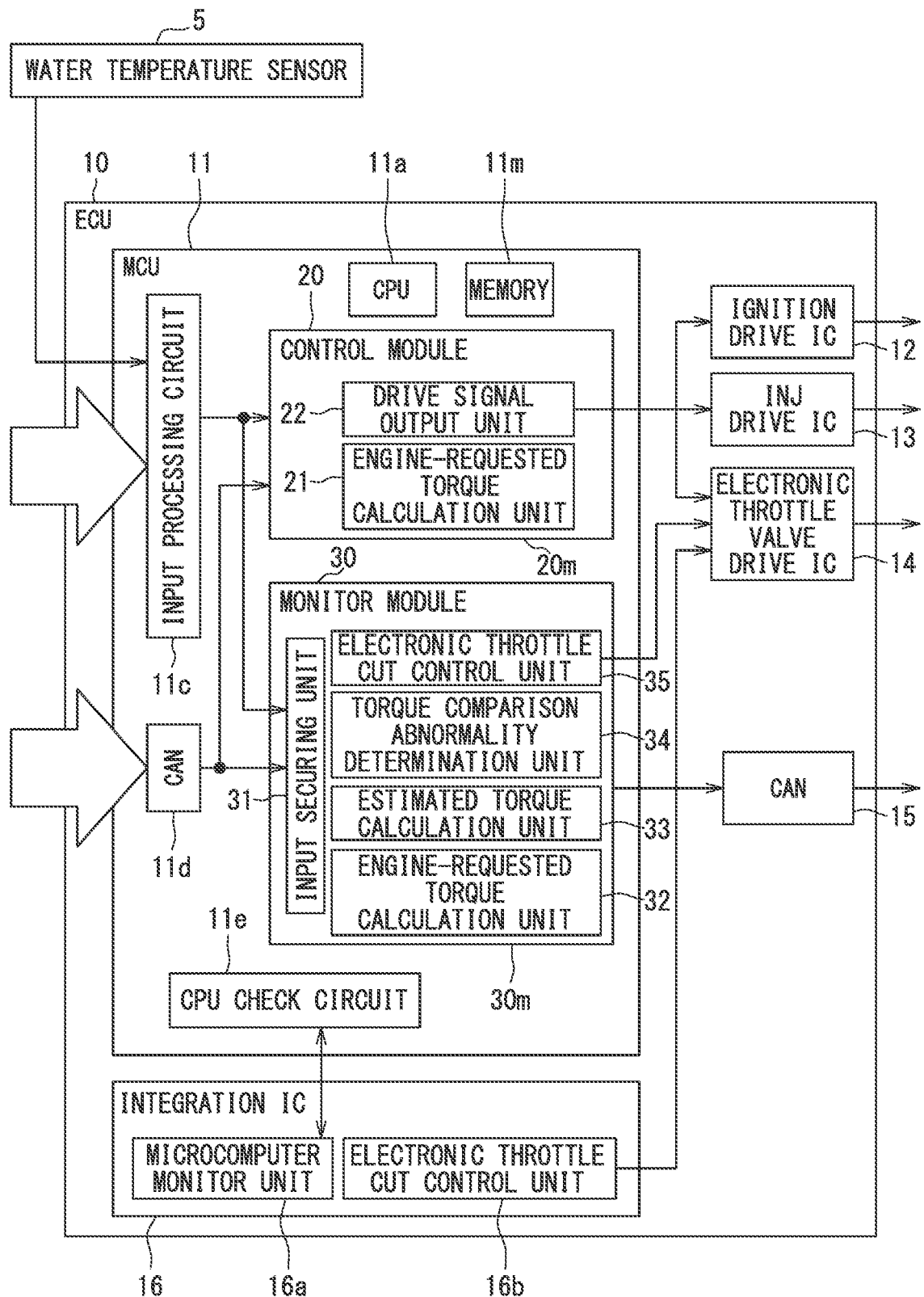
FIG. 1 is a block diagram of the internal combustion engine control system according to a first embodiment.

Hereinafter, examples of the present disclosure will be described.

According to an example of the present disclosure, a control system includes a control unit and a monitor unit. The control unit controls a combustion state of an internal combustion engine. The monitor unit monitors a torque abnormality of the internal combustion engine. The monitor unit determines an abnormal torque state when the actual torque of the internal combustion engine differs from an engine-requested torque required for the internal combustion engine.

Generally, this type of control unit uses a temperature sensor that detects various types of temperature and corrects controlled items based on detection values. According to an example of the present disclosure, the temperature sensor detects a temperature of cooling water that is to cool the internal combustion engine, a temperature of lubricating oil, a temperature of intake air, and a temperature of fuel. When the lubricating oil temperature is low, for example, the lubricating oil viscosity increases, and a friction loss increases accordingly. The control unit corrects the temperature to compensate for the loss so that the output torque increases. The same applies to a case where the monitor unit calculates the actual torque and the engine-requested torque used for the torque abnormality determination. This configuration may improve the accuracy of monitoring torque abnormality by applying the temperature correction to the actual torque or the engine-requested torque using detection values from the temperature sensor.

In a case where the temperature sensor malfunctions due to disconnection or short-circuiting, the control unit would erroneously correct the temperature. Consequently, the actual torque may differ from the engine-requested torque. The erroneous temperature correction may be also applied to the monitor unit. Therefore, this configuration may possibility to fail to correctly detect a difference between the actual torque and the engine-requested torque.

The inventors therefore has examined a configuration as follows. This configuration determines that the temperature sensor malfunctions when a detection value of the temperature sensor exceeds an anticipated range and indicates an abnormal value. This configuration controls the internal combustion engine while limiting the controlled items of the control unit (limited control).

However, the temperature sensor slowly responds to its detection (such as approximately ten seconds). The configuration is highly likely to incorrectly determine that the temperature malfunctions only because a detection value is abnormal. The inventors have further examined to perform the limited control by recognizing the temperature sensor to malfunction under the condition that the abnormal value state remains longer than or equal to a predetermined time (such as ten seconds).

However, in a configuration that performs the malfunction determination on the temperature sensor after a lapse of the predetermined time, the monitor unit cannot properly correct the temperature during a malfunction determination period ranging from an occurrence of an abnormal value to a lapse of the predetermined time as above. That is, this configuration cannot properly monitor the torque abnormality. Therefore, during the malfunction determination period, the control unit controls the internal combustion engine in a state of not properly monitoring the torque abnormality.

According to an aspect of the present disclosure, an internal combustion engine control system comprises: a control unit configured to control a combustion state of an internal combustion engine based on a detection value of a temperature sensor that is configured to detect a temperature of a detection object; a monitor unit configured to calculate an estimated torque as an estimated value of an actual torque of the internal combustion engine and an engine-requested torque requested for the internal combustion engine and to monitor whether the estimated torque differs from the engine-requested torque by an amount greater than or equal to a predetermined criterion to be in an abnormal torque state; and a detection abnormality determination unit configured to determine whether one of the detection value and a behavior of the detection value is abnormal. The monitor unit includes: a normal-state torque calculation unit configured to calculate the estimated torque by using the detection value when the detection abnormality determination unit does not determine an abnormality; and an abnormal-state torque calculation unit configured to calculate the estimated torque by inhibiting using of the detection value when the detection abnormality determination unit determines an abnormality.

The internal combustion engine control system according to the present disclosure uses the detection value to calculate the estimated torque used for torque abnormality monitoring when the temperature sensor is normal, namely, on not determination that the detection value or behavior of the detection value of the temperature sensor is abnormal. In the normal state, this system enables to monitor a torque abnormality by taking into account the temperature of the detection object and improve the monitoring accuracy.

To the contrary, the system calculates the estimated torque without the use of the detection value of the temperature sensor when the temperature sensor is abnormal, namely, on determination that the detection value or behavior of the same from the temperature sensor is abnormal. This system enables to improve the monitoring accuracy compared to the monitor using the abnormal value though the monitoring accuracy is lower than the same in the state where the temperature sensor is normal. Therefore, the system enables to monitor the torque abnormality during the malfunction determination period even taking the time (the malfunction determination period) enough to determine whether the temperature sensor malfunctions.

The description below explains multiple embodiments of the present disclosure with reference to the accompanying drawings. Functionally and/or structurally corresponding and/or associated parts in a plurality of embodiments may be designated by the same reference numerals or those differing in digits higher than or equal to the hundreds place. The description of the other embodiments can be referenced for the corresponding and/or associated parts.

First Embodiment

FIG. 1 illustrates an ECU (Electronic Control Unit) 10 provided to a vehicle. The ECU 10 controls operations of an internal combustion engine mounted on a vehicle. The vehicle travels by using the internal combustion engine as a drive source. The present embodiment assumes an ignition gasoline engine to be the internal combustion engine. It is noted that, a self-igniting diesel engine may also be applicable. The vehicle includes a transmission that converts a revolution speed from an output shaft of the internal combustion engine into an intended revolution speed and outputs the revolution speed.

The ECU 10 includes an MCU 11 (Micro Controller Unit), an ignition drive IC 12, a fuel injection valve drive IC 13, an electronic throttle valve drive IC 14, a communication circuit 15, and an integration IC 16.

The MCU 11 includes a CPU 11a as an arithmetic processing unit, a memory 11m as a storage medium, an input processing circuit 11c, a communication circuit 11d, and a CPU check circuit 11e. According to the example in FIG. 1, the MCU 11 uses one semiconductor chip that integrates the CPU 11a, the memory 11m, the input processing circuit 11c, the communication circuit 11d, and the CPU check circuit 11e. However, these components may be distributed to a plurality of semiconductor chips for integration. In a configuration where the components are distributed to the semiconductor chips for integration, the semiconductor chips may be mounted on a common substrate or may be mounted on a plurality of substrates respectively. The semiconductor chips may be accommodated in a common container or may be accommodated in separate containers.

The memory 11m represents a storage medium to store program and data and includes a non-transitory tangible storage medium to temporarily store a program the CPU 11a can read. The storage medium can be provided as a semiconductor memory or a magnetic disk. The CPU 11a executes a program stored in the memory 11m and thereby allows the ECU 10 to function as the device described in this specification and allows the control device to function to perform the method described in this specification.

Means and/or functions provided by the control device are available as the software stored on a substantial recording medium and a computer to execute the software, only the software or the hardware or a combination of these. When the control device is supplied as an electronic circuit or the hardware, for example, the control device is available as a digital circuit or an analog circuit including many logic circuits.

The MCU 11 is supplied with various signals such as engine speed, an accelerator position, an intake manifold pressure, an exhaust pressure, water temperature, oil temperature, and an external signal output from an external ECU. These signals are input to the input processing circuit 11c or the communication circuit 11d from the outside of the ECU 10.

A signal corresponding to the engine speed represents a detection value of a crank angle sensor. Based on this detection value, the MCU 11 calculates the number of revolutions of a crankshaft (output shaft) of the internal combustion engine per unit time, namely, the revolution speed of the output shaft. A signal corresponding to the accelerator position represents a detection value of an accelerator pedal sensor. Based on this detection value, the MCU 11 calculates the amount of accelerator pedal depression operated by a vehicle driver or a user of the internal combustion engine.

A signal corresponding to the intake manifold pressure represents a detection value of an intake air pressure sensor. Based on this detection value, the MCU 11 calculates the pressure of intake air introduced into a combustion chamber. A signal corresponding to the exhaust pressure represents a detection value of an exhaust pressure sensor. Based on this detection value, the MCU 11 calculates the pressure of exhaust gas from a combustion chamber. A signal corresponding to the water temperature represents a detection value of a water temperature sensor 5. Based on this detection value, the MCU 11 calculates the temperature of water to cool the internal combustion engine. A signal corresponding to the oil temperature represents a detection value of an oil temperature sensor. Based on this detection value, the MCU 11 calculates the temperature of lubricating oil of the internal combustion engine or working fluid of a hydraulic actuator.

The water temperature sensor 5 is attached to a cylinder block of the internal combustion engine. The water temperature sensor 5 outputs a voltage signal (voltage value) corresponding to the temperature (water temperature) of cooling water flowing through a cooling water channel provided for the cylinder block. The input processing circuit 11*c* converts the output signal as an analog signal into a digital signal representing the water temperature. The water temperature sensor 5 is comparable to a "temperature sensor" that detects the temperature of cooling water as a detection object.

Examples of external signals output from the external ECU include a signal representing an operation state of an auxiliary machine that uses the output shaft of the internal combustion engine as a drive source. Examples of the auxiliary machine include a refrigerant compressor included in an air conditioner that provides air conditioning inside a vehicle compartment. The compressor uses the output shaft of the internal combustion engine as a drive source.

The ignition drive IC 12 includes a switching element that controls activation and inactivation of power supply to an ignition device included in the internal combustion engine. The MCU 11 outputs a directive signal to the switching element. Based on the above-described various signals such as the engine speed, the MCU 11 calculates a target ignition timing, namely, a target value of the time when the ignition device activates discharge ignition. The MCU 11 outputs a directive signal corresponding to the calculated target ignition timing to the ignition drive IC 12.

The fuel injection valve drive IC 13 includes a switching element that controls activation and inactivation of power supply to a fuel injection valve included in the internal combustion engine. The MCU 11 outputs a directive signal to the switching element. Specifically, the MCU 11 calculates a target injection amount based on the above-described various signals such as engine speed. The target injection amount represents a target value of the period (injection amount) during which the fuel injection valve injects the fuel. The MCU 11 outputs a directive signal corresponding to the calculated target injection amount to the fuel injection valve drive IC 13.

The electronic throttle valve drive IC 14 includes a switching element that controls activation and inactivation of power supply to an electronic throttle valve included in the internal combustion engine. The MCU 11 outputs a directive signal to the switching element. Specifically, the MCU 11 calculates a target opening degree based on the above-described various signals such as engine speed. The target opening degree represents a target value of the valve opening degree for the electronic throttle valve. The MCU 11 outputs a directive signal corresponding to the calculated target opening degree to the electronic throttle valve drive IC 14.

The ECU 10 controls operations of the ignition device, the fuel injection valve, and the electronic throttle valve to control a combustion state of the internal combustion engine. The target ignition timing, the target injection amount, and the target opening degree calculated by the MCU 11 are comparable to a target control amount as a target value of the control amount to control the combustion state of the internal combustion engine.

The communication circuit 15 outputs various types of information managed by the MCU 11 to an external ECU. For example, the communication circuit 15 outputs a signal for an abnormality flag to a display ECU. The abnormality flag notifies an occurrence of abnormality such as an abnormal torque state to be described. The display ECU controls operations of a display device the vehicle driver visually recognizes. The display ECU generates an alarm indication or alarm sound when acquiring the signal for the abnormality flag.

The integration IC 16 mainly includes, though unshown, a memory and a CPU to execute various types of programs stored in the memory. Depending on a program executed by the CPU, the integration IC 16 functions as a microcomputer monitor unit 16*a* or an electronic throttle cut control unit 16*b*.

The CPU check circuit 11*e* checks whether the CPU 11*a* and the memory 11*m* are normal by performing a check (such as a parity check) to determine whether programs and data stored in the memory 11*m* are normal. The microcomputer monitor unit 16*a* monitors malfunctioning of the MCU 11 by referencing check results from the CPU check circuit 11*e*.

The integration IC 16 performs control of electronic throttle cut that limits operations of the electronic throttle valve when the microcomputer monitor unit 16*a* detects an abnormality. For example, the integration IC 16 binds the target opening degree to a predetermined opening degree regardless of the accelerator opening degrees and limits output from the internal combustion engine to be less than a predetermined output. Alternatively, the integration IC 16 zeroes the target opening degree and forcibly stops the internal combustion engine. The electronic throttle cut control unit 16*b* outputs a signal directing the electronic throttle cut to the electronic throttle valve drive IC 14. The electronic throttle valve drive IC 14 operates on an electronic throttle cut directive signal in priority to directive signals output from the MCU 11.

The MCU 11 includes a control module 20 and a monitor module 30. These modules are functions provided from the CPU 11*a* and the memory 11*m* that are used in common. The CPU 11*a* and the memory 11*m* function as the control module 20 when the CPU 11*a* executes a control program stored in a control-use storage area 20*m* of the memory 11*m*.

The CPU 11*a* and the memory 11*m* function as the monitor module 30 when the CPU 11*a* executes a monitor program stored in a monitor-use storage area 30*m* of the memory 11*m*. The control-use storage area 20*m* and the monitor-use storage area 30*m* are separately allocated to different locations in the storage area of the memory 11*m*.

The control module 20 provides a "control-use arithmetic device" depending on user-requested torque as the torque requested by a user to drive the internal combustion engine. The "control-use arithmetic device" performs an arithmetic operation on the above-described various types of target control amounts. The monitor module 30 provides a "monitor-use arithmetic device" to monitor whether an abnormal torque state occurs. The abnormal torque state signifies that estimated torque as an estimated value of the actual torque of the internal combustion engine differs from the engine-requested torque requested for the internal combustion engine by an amount greater than or equal to a predetermined criterion. The ECU 10 provides an "internal combustion engine control system" including the control-use arithmetic device and the monitor-use arithmetic device.

<1>Control Module 20

The control module 20 includes functions as an engine-requested torque calculation unit 21 and a drive signal output unit 22. The engine-requested torque calculation unit 21 calculates the engine-requested torque based on various signals acquired from the input processing circuit 11c and the communication circuit 11d. The engine-requested torque is requested for the internal combustion engine. Based on the engine-requested torque calculated by the engine-requested torque calculation unit 21, the drive signal output unit 22 performs an arithmetic operation on the above-described target control amounts such as the target ignition timing, the target injection amount, and the target opening degree. Based on the arithmetically operated target control amounts, the drive signal output unit 22 outputs various directive signals to the actuators such as the ignition drive IC 12, the fuel injection valve drive IC 13, and the electronic throttle valve drive IC 14.

Figure 2:
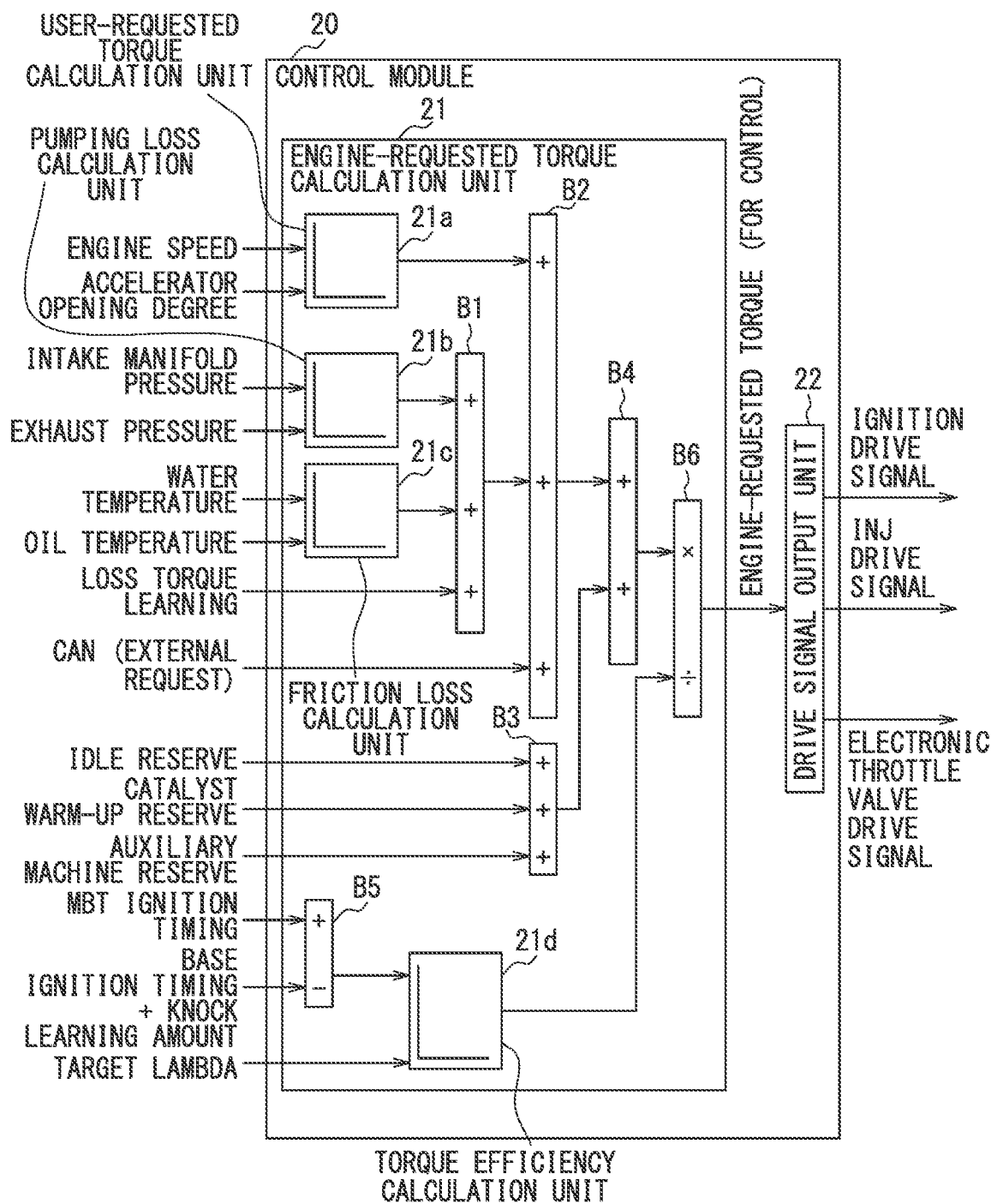
FIG. 2 is a block diagram of the control module illustrated in FIG. 1.

The detailed description follows by use of FIG. 2. The engine-requested torque calculation unit 21 includes functions as a user-requested torque calculation unit 21a, a pumping loss calculation unit 21b, a friction loss calculation unit 21c, a torque efficiency calculation unit 21d, and operation portions B1 through B6.

<1-1>User-Requested Torque

The user-requested torque calculation unit 21a calculates user-requested torque based on the engine speed and the accelerator opening degree described above. The user-requested torque is calculated to be an increasingly large value as the engine speed or the accelerator opening degree increases. For example, the memory 11m in advance stores a map representing correlations among the engine speed, the accelerator opening degree, and the user-requested torque. With reference to the map, the user-requested torque calculation unit 21a calculates the user-requested torque corresponding to the engine speed and the accelerator opening degree.

<1-2>Loss Torque

The pumping loss calculation unit 21b calculates pumping loss torque based on the intake manifold pressure and the exhaust pressure described above. The pumping loss torque represents a value resulting from converting a pumping loss into the torque. The pumping loss signifies an energy loss due to the resistance caused by the intake and exhaust when a piston of the internal combustion engine reciprocates. A decrease in the intake manifold pressure increases a pumping loss value on the assumption that an intake stroke of the piston causes large intake resistance. An increase in the exhaust pressure increases a pumping loss value on the assumption that an exhaust stroke of the piston causes large exhaust resistance. For example, the memory 11m in advance stores a map representing correlations among the intake manifold pressure, the exhaust pressure, and the pumping loss. With reference to the map, the pumping loss calculation unit 21b calculates a pumping loss corresponding to the intake manifold pressure and the exhaust pressure.

The friction loss calculation unit 21c calculates friction loss torque based on the water temperature and the oil temperature described above. The friction loss torque represents a value resulting from converting a friction loss into the torque. The friction loss signifies a mechanical energy loss due to the friction between a cylinder and the reciprocating piston in the internal combustion engine. The friction is assumed to be large when the water temperature decreases or increases to be outside an appropriate range. The friction loss is set to a large value. The viscosity of lubricating oil, for example, is assumed to be large when the oil temperature is low. The friction loss is set to a large value. For example, the memory 11m in advance stores a map representing correlations among the water temperature, the oil temperature, and the friction loss. With reference to the map, the friction loss calculation unit 21c calculates a friction loss corresponding to the water temperature and the oil temperature.

The operation portion B1 arithmetically operates a total loss torque by adding the pumping loss calculated by the pumping loss calculation unit 21b, the friction loss calculated by the friction loss calculation unit 21c, and a loss torque learning value. The operation portion B2 arithmetically operates a loss-inclusive torque by adding the user-requested torque calculated by the user-requested torque calculation unit 21a, the total loss torque calculated by the operation portion B1, and the externally requested torque. Examples of the externally requested torque include the torque corresponding to an increase in the power generation when a generator driven by the internal combustion engine increases the amount of power generation to charge an onboard battery.

<1-3>Reserves

The operation portion B3 arithmetically operates a reserve torque by adding torques corresponding to an idle reserve, a catalyst warm-up reserve, and an auxiliary machine reserve. The control module 20 sets each of the reserve torques corresponding to the operation state of the internal combustion engine such as the engine speed, the engine load, and the water temperature. The operation portion B4 arithmetically operates a reserve-inclusive torque by adding the reserve torque arithmetically operated by the operation portion B3 to the loss-inclusive torque arithmetically operated by the operation portion B2.

The idle reserve torque corresponds to an increase in the torque when the control is performed to increase the torque during idling operation of the internal combustion engine and to stabilize the combustion. The catalyst warm-up reserve torque corresponds to a value resulting from converting a combustion energy loss into the torque. The combustion energy is used to perform warm-up control to increase the exhaust temperature. The warm-up control increases the exhaust temperature to increase the temperature of a catalyst purifying the exhaust gas from the internal combustion engine to be higher than or equal to the activation temperature. The auxiliary machine reserve torque is needed to drive the auxiliary machine such as a generator using the internal combustion engine as a drive source.

<1-4>Torque Efficiency

The torque efficiency calculation unit 21d calculates a torque efficiency based on an ignition timing to generate the maximum torque (MBT ignition timing), a base retard angle amount including knock learning, and a target lambda. The MBT ignition timing signifies an ignition timing to acquire the maximum torque and differs mainly depending on the engine speed, the engine load, and the water temperature. However, knocking easily occurs at the MBT ignition timing. The ignition needs to occur at a timing later than the MBT ignition timing for a predetermined time, namely, at a timing retarded by a predetermined angle. The timing retarded by a predetermined angle is denoted as a base ignition timing. The retard angle amount (base retard angle amount) differs mainly depending on the engine speed, the engine load, and the water temperature.

When a sensor detects knocking, feedback control is performed to correct and retard the ignition timing for a predetermined time. Learning control denoted as knock learning reflects the retard angle correction amount (knock learning amount) on the subsequent ignition timing control. The target ignition timing reflects the knock learning amount on the base ignition timing.

The operation portion B5 subtracts the target ignition timing from the MBT ignition timing to arithmetically operate an MBT retard angle amount, namely, the retard angle amount as a difference between the MBT ignition timing and the target ignition timing. The torque efficiency calculation unit 21d calculates the torque efficiency based on the MBT retard angle amount and the target lambda arithmetically operated by the operation portion B5.

The torque efficiency denotes a ratio between the combustion energy in the combustion chamber and the energy converted into the rotating torque of the crankshaft. The torque efficiency is calculated to be an increasingly large value as the MBT retard angle amount decreases, namely, the target ignition timing approximates to the MBT ignition timing. The target lambda denotes a target value of a ratio (lambda) between the air and the fuel contained in an air-fuel mixture combusted in the combustion chamber. The torque efficiency calculation unit 21d calculates the torque efficiency as a value corresponding to the target lambda. For example, the memory 11m in advance stores a map representing correlations among the MBT retard angle amount, the target lambda, and the torque efficiency. With reference to the map, the torque efficiency calculation unit 21d calculates the torque efficiency corresponding to the MBT retard angle amount and the target lambda.

The control module 20 sets each of the MBT ignition timing, the base ignition timing, and the target lambda described above corresponding to the operation state of the internal combustion engine such as the engine speed, the engine load, and the water temperature.

The control module 20 performs the learning control related to the above-described knock learning. The ECU 10 according to the present embodiment includes a detection circuit that detects a drive current or voltage output from the ignition drive IC. The control module 20 performs an arithmetic operation on the engine-requested torque by using a detection value of the detection circuit. Specifically, the control module 20 calculates an actual ignition timing based on the detection value, performs the learning control related to the knock learning by using the actual ignition timing, and calculates the knock learning amount.

<1-5>Control-Use Engine-Requested Torque

The operation portion B6 divides the reserve-inclusive torque arithmetically operated by the operation portion B4 by the torque efficiency calculated by the torque efficiency calculation unit 21d to arithmetically operate a control-use engine-requested torque used for the engine control. Namely, the engine-requested torque calculation unit 21 adds the total loss torque and the reserve torque to the user-requested torque and divides the added value by the torque efficiency to calculate the engine-requested torque.

<2>Monitor Module 30

As above, the monitor module 30 monitors whether an estimated torque enters the abnormal torque state to differ from the engine-requested torque by an amount greater than or equal to a predetermined criterion. The estimated torque provides a value estimated for the actual torque of the internal combustion engine. The engine-requested torque denotes the torque requested for the internal combustion engine and equals the engine-requested torque calculated by the engine-requested torque calculation unit 21 of the control module 20. However, the engine-requested torque calculated by the monitor module 30 is used to monitor a torque abnormality. The engine-requested torque calculated by the control module 20 is used to calculate the target control amount for the internal combustion engine. The monitor-use engine-requested torque and the control-use engine-requested torque are arithmetically operated at different locations in the storage area of the memory 11m.

As illustrated in FIG. 1, the monitor module 30 includes functions as an input securing unit 31, an engine-requested torque operation portion 32, an estimated torque operation portion 33, a torque comparison abnormality determination unit 34, and an electronic throttle cut control unit 35.

The input securing unit 31 performs a check (such as a parity check) to determine whether data for various signals acquired from the input processing circuit 11c and the communication circuit 11d is normal. If the data is abnormal, the input securing unit 31 repairs, re-acquires, or discards the data. This can allow the monitor module 30 to avoid various calculations by using the abnormal data. The input securing unit 31 secures the normality of various data used for the calculation on the monitor module 30.

The torque comparison abnormality determination unit 34 calculates a difference between the engine-requested torque calculated by the engine-requested torque operation portion 32 and the estimated torque calculated by the estimated torque operation portion 33. The above-described abnormal torque state is acknowledged if the difference is greater than or equal to a predetermined criterion. When the abnormal torque state is acknowledged, the electronic throttle cut control unit 35, like the electronic throttle cut control unit 16b, outputs a signal directing the electronic throttle cut to the electronic throttle valve drive IC 14.

<2-1>Monitor-Use Engine-Requested Torque

Figure 3:
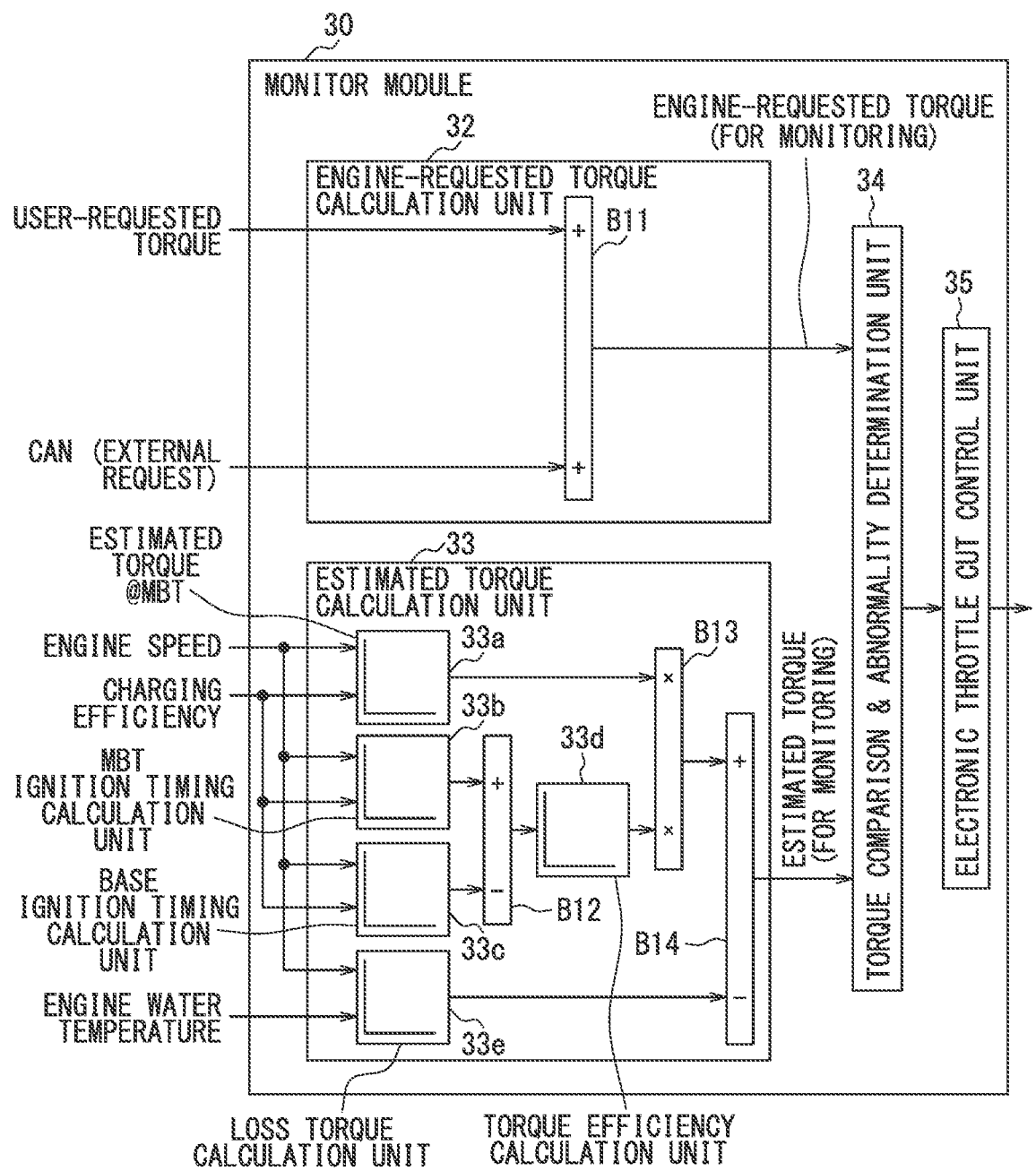
FIG. 3 is a block diagram of the monitor module illustrated in FIG. 1.

As illustrated in FIG. 3, the engine-requested torque operation portion 32 includes functions as an operation portion B11 that adds the user-requested torque and the externally requested torque to calculate the engine-requested torque requested for the internal combustion engine. The user-requested torque used for this calculation is calculated by use of data such as the engine speed and the accelerator opening degree secured by the input securing unit 31. The engine-requested torque operation portion 32 calculates the engine-requested torque requested for the internal combustion engine based on the various signals (data) that are acquired from the input processing circuit 11c and the communication circuit 11d and are secured by the input securing unit 31.

<2-2>Monitor-Use Estimated Torque

As illustrated in FIG. 3, the estimated torque operation portion 33 includes functions as an estimated torque calculation unit 33a, an MBT ignition timing calculation unit 33b, a base ignition timing calculation unit 33c, a torque efficiency calculation unit 33d, a loss torque calculation unit 33e, and operation portions B12, B13, and B14.

The estimated torque calculation unit 33a estimates an actual drive torque (MBT estimated torque) of the internal combustion engine at the MBT ignition timing based on the charging efficiency and the engine speed described above. The MBT estimated torque is calculated to be an increasingly large value as the engine speed or the charging efficiency increases. For example, the memory 11m in advance stores a map representing correlations among the engine speed, the charging efficiency, and the MBT estimated torque. With reference to the map, the estimated torque calculation unit 33a calculates the MBT estimated torque corresponding to the engine speed and the charging efficiency.

The MBT ignition timing calculation unit 33b calculates the MBT ignition timing based on the charging efficiency and the engine speed. The base ignition timing calculation unit 33c calculates the base ignition timing based on the charging efficiency and the engine speed. The MBT ignition timing and the base ignition timing are calculated by reference to the map in advance stored in the memory 11m similarly to the estimated torque calculation unit 33a.

The operation portion B12 subtracts the base ignition timing calculated by the base ignition timing calculation unit 33c from the MBT ignition timing calculated by the MBT ignition timing calculation unit 33b and arithmetically operates the subtracted value as the above-described base retard angle amount. The torque efficiency calculation unit 33d calculates the above-described torque efficiency based on the base retard angle amount arithmetically operated by the operation portion B12. The torque efficiency calculation unit 33d calculates the torque efficiency by recognizing the knock learning amount to be a predetermined value or zero.

The loss torque calculation unit 33e calculates a loss torque based on the engine speed and the water temperature. The loss torque represents a value resulting from converting the loss energy including the pumping loss and the friction loss into the torque. For example, the memory 11m in advance stores a map representing correlations among the engine speed, the water temperature, and the loss torque. With reference to the map, the loss torque calculation unit 33e calculates the loss torque corresponding to the engine speed and the water temperature.

The operation portion B13 multiplies the MBT estimated torque calculated by the estimated torque calculation unit 33a by the torque efficiency arithmetically operated by the torque efficiency calculation unit 33d and arithmetically operates the multiplied value as an estimated torque exclusive of the loss torque. The operation portion B14 subtracts the loss torque calculated by the loss torque calculation unit 33e from the estimated torque arithmetically operated by the operation portion B13 and arithmetically operates the subtracted value as a monitor-use estimated torque.

As above, the estimated torque operation portion 33 estimates a drive torque output from the internal combustion engine based on the various signals (data) that are acquired from the input processing circuit 11c and the communication circuit 11d and are secured by the input securing unit 31.

<3>Processes Performed by the Monitor Module 30

The monitor module 30 always activates a monitor function while the internal combustion engine operates. Specifically, the main process illustrated in FIG. 4 is always performed.

Figure 4:
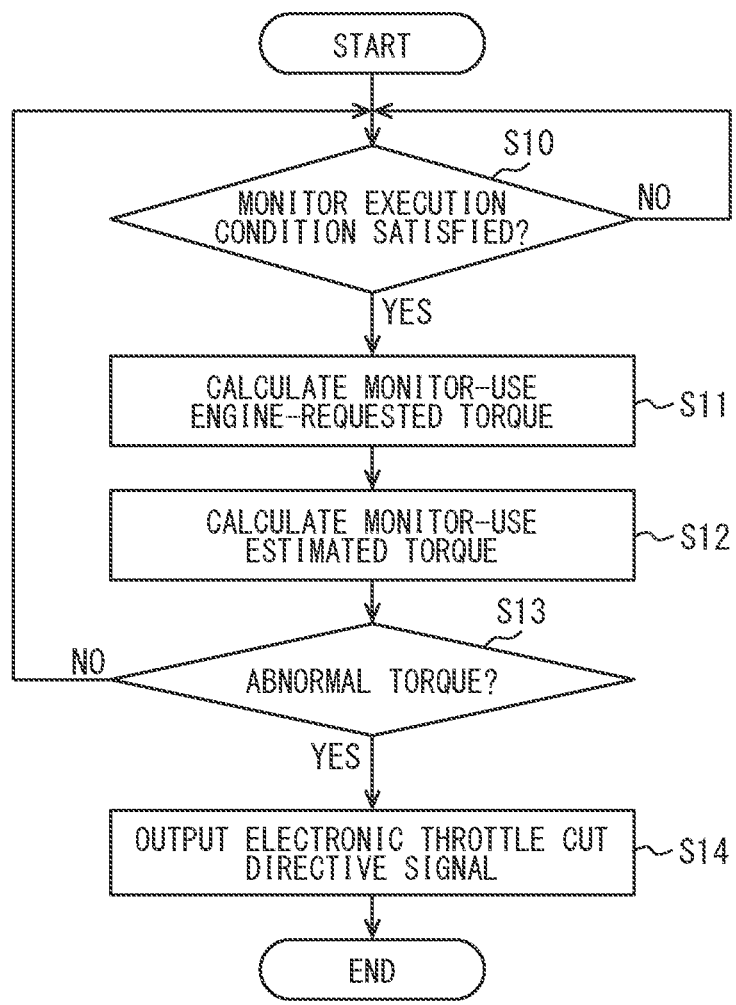
FIG. 4 is a flowchart illustrating a procedure of torque monitor control according to the first embodiment.

In S10, the main process in FIG. 4 determines whether a monitor execution condition is satisfied. Examples of the monitor execution condition include the completion of the check performed by the CPU check circuit 11e and no abnormality detected by the microcomputer monitor unit 16a.

If it is determined that the monitor execution condition is satisfied, then, in S11, the above-described engine-requested torque operation portion 32 calculates a monitor-use engine-requested torque. A block to calculate the user-requested torque is omitted from the engine-requested torque operation portion 32 in FIG. 3. However, the user-requested torque is calculated based on the engine speed and the accelerator opening degree similarly to the user-requested torque calculation unit 21a, for example. The user-requested torque is calculated by the use of data such as the engine speed and the accelerator opening degree secured by the input securing unit 31.

In S12, the above-described estimated torque operation portion 33 calculates a monitor-use estimated torque. In S13, the above-described torque comparison abnormality determination unit 34 determines whether the torque is abnormal. If it is determined in S13 that the torque is abnormal, then, in S14, the electronic throttle cut control unit 35 outputs the electronic throttle cut directive signal.

<4>Measures Against Malfunction of the Water Temperature Sensor 5

The water temperature detected by the water temperature sensor 5 is used for the control module 20 to calculate the engine-requested torque and for the monitor module 30 to calculate the estimated torque as above. In detail, the water temperature is used for the friction loss calculation unit 21c to calculate the friction loss and for the loss torque calculation unit 33e to calculate the loss torque. When the water temperature sensor 5 malfunctions, the engine-requested torque and the estimated torque are not calculated correctly if a detection value of the water temperature sensor 5 is directly used for the above-described calculations.

Examples of malfunction of the water temperature sensor 5 include disconnection, short-circuiting, and stack. When the malfunction such as disconnection or short-circuiting occurs, an output from the water temperature sensor 5 is bound to the maximum or minimum value in a variable range and remains unchanged. When the malfunction such as stack occurs, an output from the water temperature sensor 5 is bound to a specific value in the variable range and remains unchanged.

The present embodiment assumes the water temperature sensor 5 to malfunction when a detection value of the water temperature sensor 5 is abnormal or behaves abnormally. The control module 20 limits output from the internal combustion engine. For example, when the engine-requested torque calculation unit 21 calculates an engine-requested torque that exceeds the upper limit, the engine-requested torque is confined to the upper limit. Alternatively, the control module 20 outputs an electronic throttle cut directive signal similarly to the electronic throttle cut control unit 35.

However, the temperature sensor 5 slowly responds to the detection (such as approximately ten seconds). It is highly likely to incorrectly determine that the temperature sensor 5 malfunctions only because a detection value is abnormal. The present embodiment assumes the temperature sensor 5 to malfunction and limits output from the internal combustion engine under the condition that the abnormal value state remains longer than or equal to a predetermined time (such as ten seconds).

However, if the malfunction determination is performed on the water temperature sensor 5 after a lapse of the predetermined time, an estimated torque is not correctly calculated during malfunction determination period M (see FIG. 13) ranging from an occurrence of an abnormal value to a lapse of the predetermined time as above. The monitor module 30 cannot correctly monitor a torque abnormality. During malfunction determination period M, the control module 20 may control the internal combustion engine in the state of not properly monitoring the torque abnormality.

According to the present embodiment, the monitor module 30 calculates an estimated torque while inhibiting the use of detection values from the water temperature sensor 5 during malfunction determination period M. The description below explains a procedure to set the water temperature used to calculate the estimated torque by the use of FIGS. 5 through 9. The monitor module 30 always performs processes illustrated in FIGS. 5 through 9 during operation of the internal combustion engine.

Figure 5:
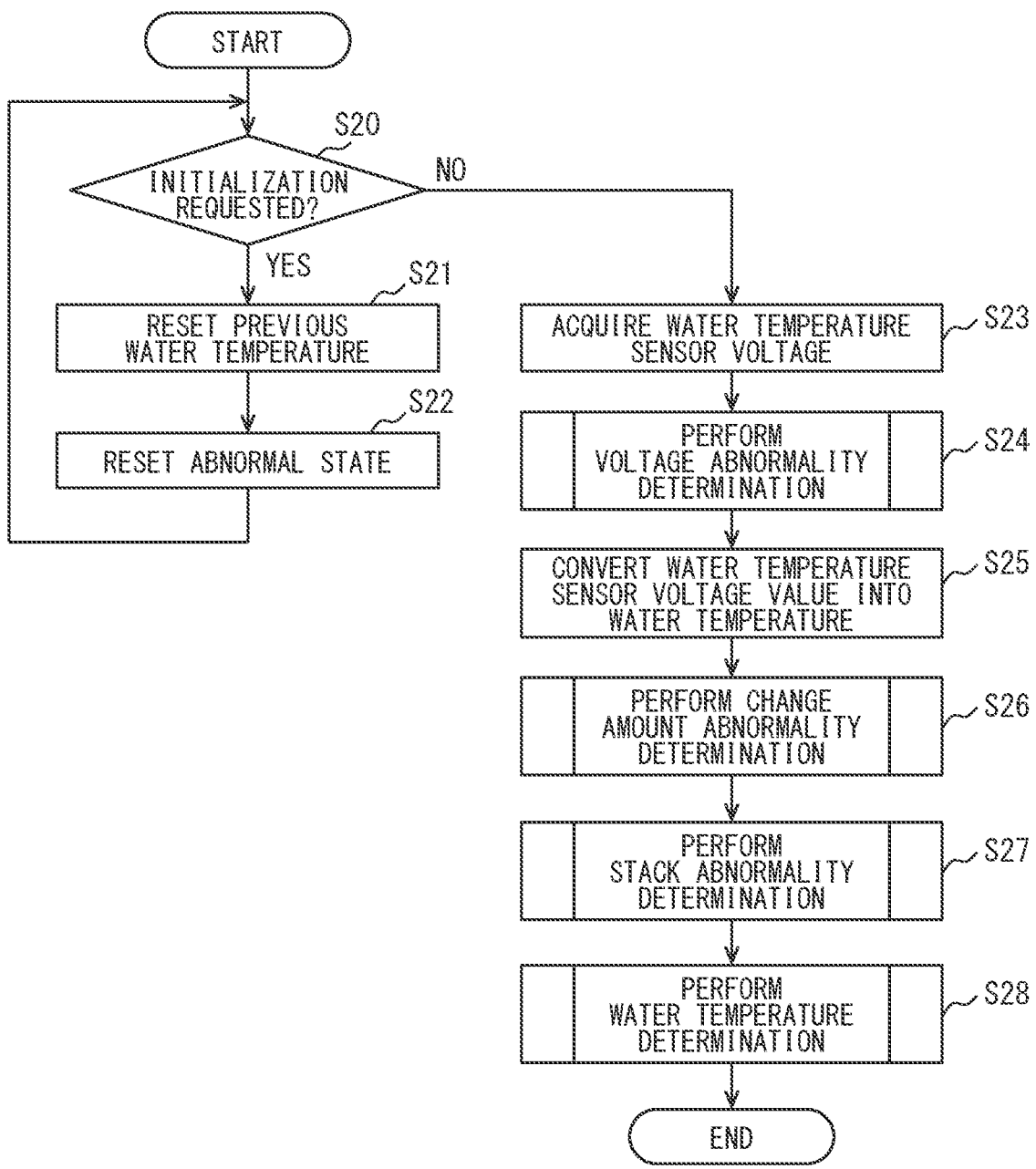
FIG. 5 is a flowchart illustrating a processing procedure to determine the water temperature used for estimated torque calculation according to the first embodiment.

In S20 in FIG. 5, the process determines whether there is a request to reset the ECU 10 or stop the internal combustion engine. If it is determined that the above-described request is available, then, in S21, the process resets the water temperature that is detected by the water temperature sensor 5 and is acquired from the previous process. In S22, the process resets a flag for the abnormal state and a flag for malfunction notification to be described later. If it is determined that the above-described request is unavailable, then, in S23, the process acquires the above-described voltage value output from the water temperature sensor 5. In S24, the process performs the voltage abnormality determination as a subroutine illustrated in FIG. 6. The voltage abnormality determination process determines whether the acquired voltage value, namely, the detection value of the water temperature sensor 5 exceeds a predetermined range between the upper and lower limits to enter a state of voltage abnormality. Based on the determination result, the voltage abnormality determination process sets the water temperature used for the estimated torque calculation.

In S25, the process converts the voltage value acquired in S23 into the water temperature. For example, the memory 11*m* in advance stores an equation expressing a relationship between the voltage value and the water temperature. The voltage value is assigned to the equation to calculate the water temperature.

Figure 7:
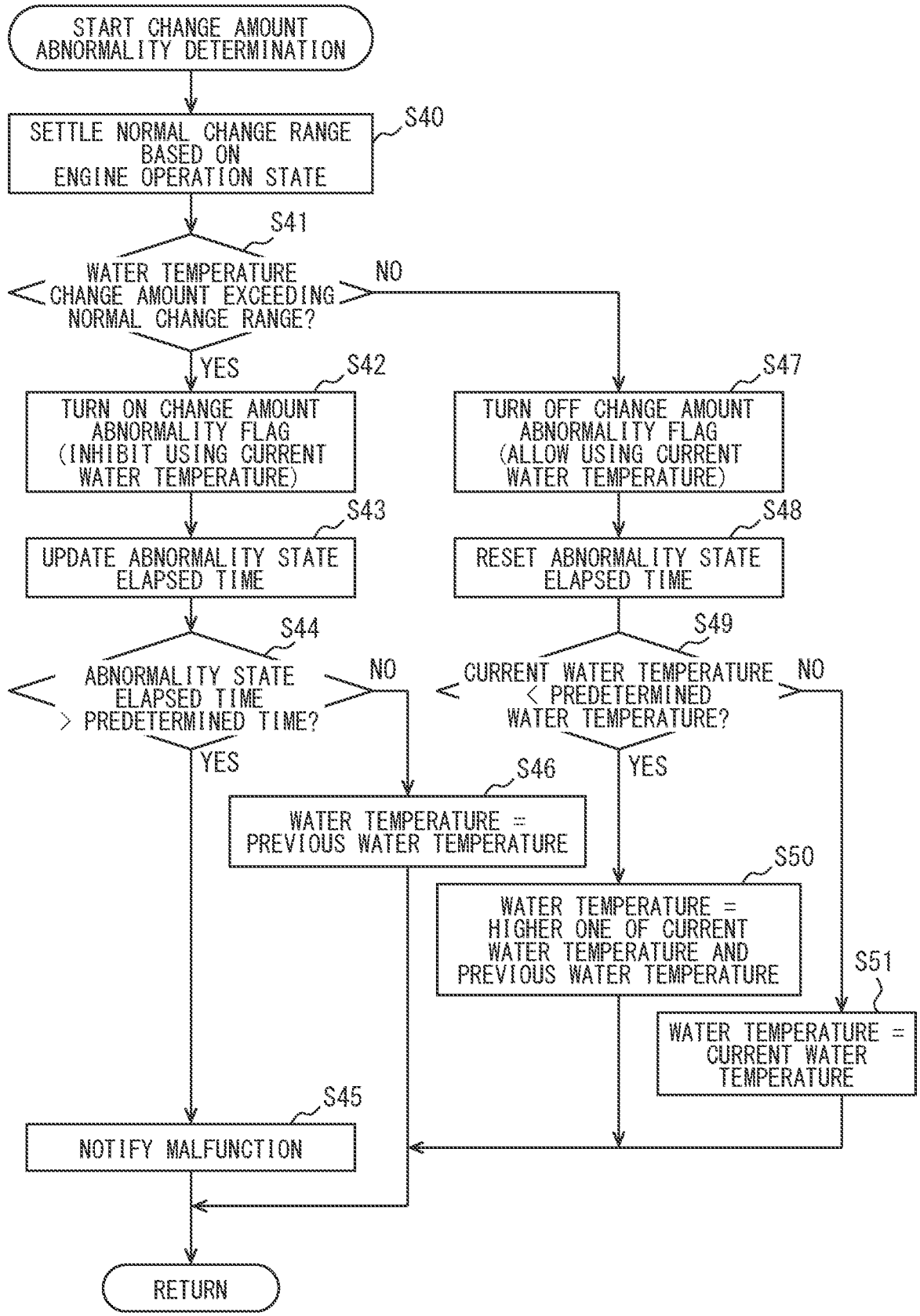
FIG. 7 is a flowchart illustrating a subroutine in FIG. 5, namely, a processing procedure of the change amount abnormality determination.

In S26, the process performs the change amount abnormality determination as a subroutine illustrated in FIG. 7. The change amount abnormality determination process determines the abnormality when a change amount per unit time in the water temperature converted in S25 exceeds a predetermined normal change range. Based on the determination result, the process sets the water temperature used for the estimated torque calculation. The process determines the abnormality of the behavior of the detected water temperature value instead of the abnormality of the detected water temperature value.

In S27, the process performs the stack abnormality determination as a subroutine illustrated in FIG. 7. The stack abnormality determination process determines the abnormality when the water temperature converted in S25 is lower than or equal to a lower limit guard value configured based on the operation state of the internal combustion engine. Based on the determination result, the process sets the water temperature used for the estimated torque calculation.

In S28, the process determines whether the estimated torque calculation uses the water temperature that is set by the abnormality determination process in S24, S26, and S27 or predetermined temperature Tb.

Figure 6:
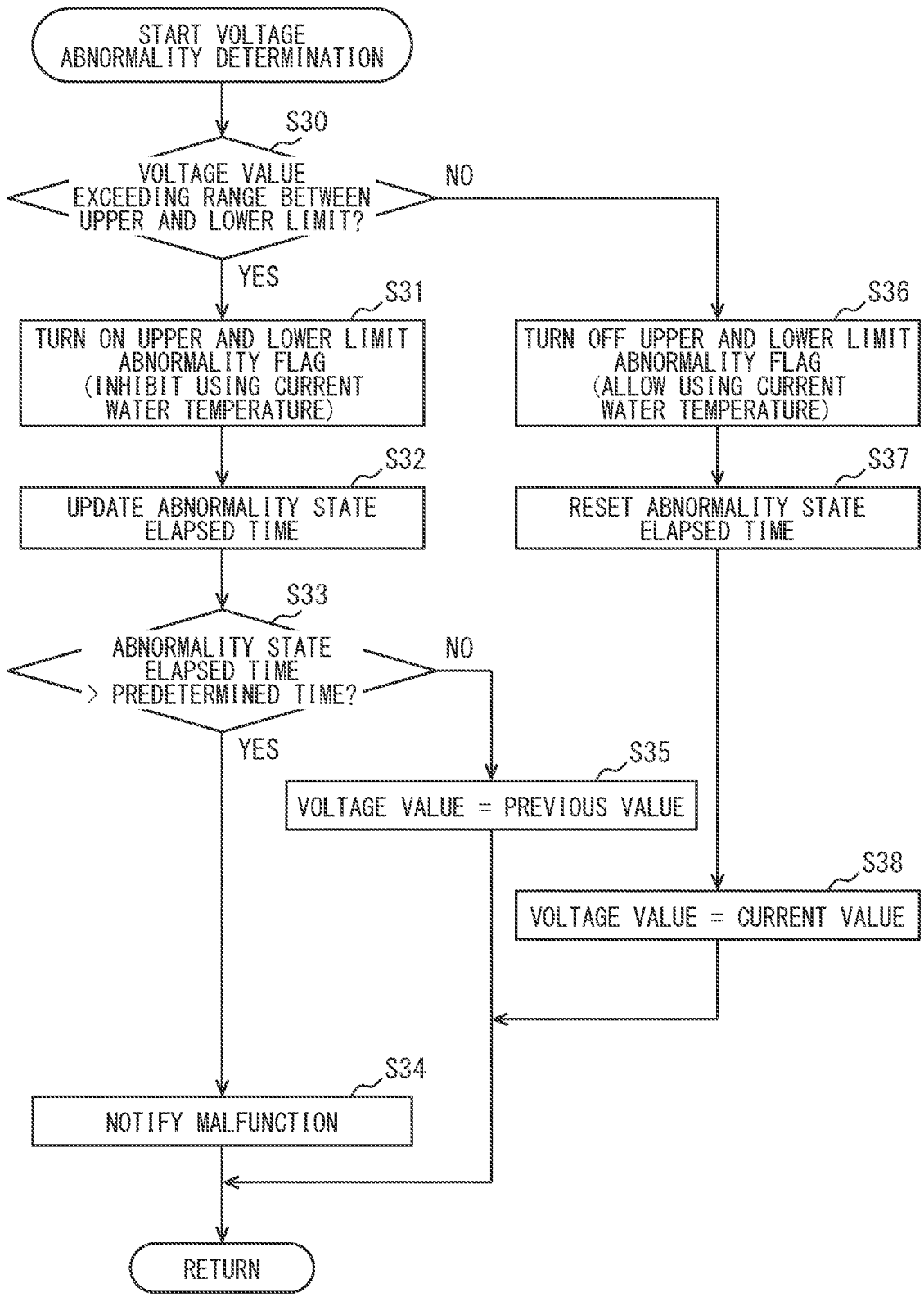
FIG. 6 is a flowchart illustrating a subroutine in FIG. 5, namely, a processing procedure of the voltage abnormality determination.

FIG. 6 illustrates the voltage abnormality determination process. In S30, the process determines whether the most recent voltage value (current value) output from the water temperature sensor 5 exceeds a predetermined range between the upper and lower limits. The upper limit and the lower limit in the range between the upper and lower limits are set to specified values regardless of the operation state of the internal combustion engine or the outside air temperature. The upper limit and the lower limit are configured so that a voltage value exceeds the range when the water temperature sensor 5 is subject to disconnection or short-circuiting.

If it is determined that the voltage value exceeds the range between the upper and lower limits, the water temperature sensor 5 is assumed to be likely to malfunction. Then, in S31, the process turns on an upper and lower limit abnormality flag and inhibits the estimated torque calculation by using the current value of the water temperature sensor 5.

In S32, the process measures an elapsed time (abnormality state elapsed time) from the detection of an upper and lower limit abnormality state. Specifically, the process starts incrementing a count value at the timing when the upper and lower limit abnormality flag changes from the off-state to the on-state. In S32, the process increments the count value by 1 to update the count value.

In S33, the process determines whether the abnormality state elapsed time exceeds a predetermined time (such as 10 seconds). If it is determined that the predetermined time is exceeded, then, in S34, the process determines that the water temperature sensor 5 malfunctions. The result is output to the control module 20 and is output from the communication circuit 15 to the outside of the ECU 10. The above-described predetermined time corresponds to malfunction determination period M to complete the determination whether the water temperature sensor 5 malfunctions. If it is determined that abnormality state elapsed time does not exceed the predetermined time, then, in S35, the process sets a voltage value used for the estimated torque calculation by using a previously acquired previous value, not the current voltage value acquired in S23. The previous value used here denotes a voltage value immediately before malfunction determination period M except voltage values acquired during malfunction determination period M.

If it is determined in S30 that the voltage value does not exceed the range between the upper and lower limits, then, in S36, the process turns off the upper and lower limit abnormality flag and permits the estimated torque calculation by using the current value of the water temperature sensor 5. In S37, the process zeroes the count value updated in S32 to reset the abnormality state elapsed time. In S38, the process sets the current voltage value acquired in S23 as a voltage value used for the estimated torque calculation.

The voltage abnormality determination process in FIG. 6 inhibits the estimated torque calculation by using the current water temperature and calculates an estimated torque by using the previous value during malfunction determination period M from the detection of an upper and lower limit abnormality state to the completion of the malfunction determination.

FIG. 7 illustrates a change amount abnormality determination process. In S40, the process sets a normal change range (see reference symbol W in FIG. 10) concerning a water temperature change amount per unit time based on the operation state of the internal combustion engine. For example, an abnormal state (see reference symbol K1 in FIG. 10) in which an excessively varied water temperature is output though the water temperature sensor 5 is free from disconnection or short-circuiting. The normal change range is configured so that the varied water temperature exceeds the normal change range in the abnormal state.

For example, if the substantial water temperature (real water temperature) is very low (such as −30° C.) when the internal combustion engine starts operating, the water temperature largely increases. The water temperature change amount increases. If the actual water temperature is sufficiently high (such as 10° C.), the water temperature does not largely increase. The water temperature change amount decreases. Considering these, it is advantageous to increase the normal change range corresponding to a decrease in the actual water temperature and avoid inadvertently recognizing the normal state of largely increasing the water temperature to be abnormal. It is advantageous to decrease the normal change range corresponding to an increase in the actual water temperature and expedite the abnormality detection. In S40, the process increases the normal change range corresponding to an operation history of the internal combustion engine when the operation history indicates low water temperatures, for example.

In S41, the process calculates a water temperature change amount output from the water temperature sensor 5 and determines whether the water temperature change amount exceeds the normal change range that is set in S40. The water temperature change amount may be provided as a value resulting from subtracting the previously acquired water temperature (previous water temperature) from the most recent water temperature (current water temperature) or an average of a plurality of water temperatures including the current water temperature acquired during a specified period.

If it is determined that the water temperature change amount exceeds the normal change range, the water temperature sensor 5 is assumed to be likely to malfunction. Then, in S42, the process turns on a change amount abnormality flag and inhibits the estimated torque calculation by using the current value of the water temperature sensor 5.

In S43, the process measures the elapsed time (abnormality state elapsed time) from the detection of the state of the abnormal change amount. Specifically, the process starts incrementing a count value at the timing when the change amount abnormality flag changes from the off-state to the on-state. In S43, the process increments the count value by 1 to update the count value.

In S44, the process determines whether the abnormality state elapsed time exceeds the specified time (malfunction determination period M). If it is determined that the specified time is exceeded, then, in S45, the process determines that the water temperature sensor 5 malfunctions. The result is output to the control module 20 and is output from the communication circuit 15 to the outside of the ECU 10. If it is determined that the abnormality state elapsed time does not exceed the specified time, then, in S46, the process sets a water temperature used for the estimated torque calculation by using a previously acquired previous water temperature, not the water temperature (current water temperature) based on the current voltage value acquired in S23. The previous water temperature used here denotes the water temperature immediately before malfunction determination period M and excludes the water temperature acquired during malfunction determination period M.

Figure 11:
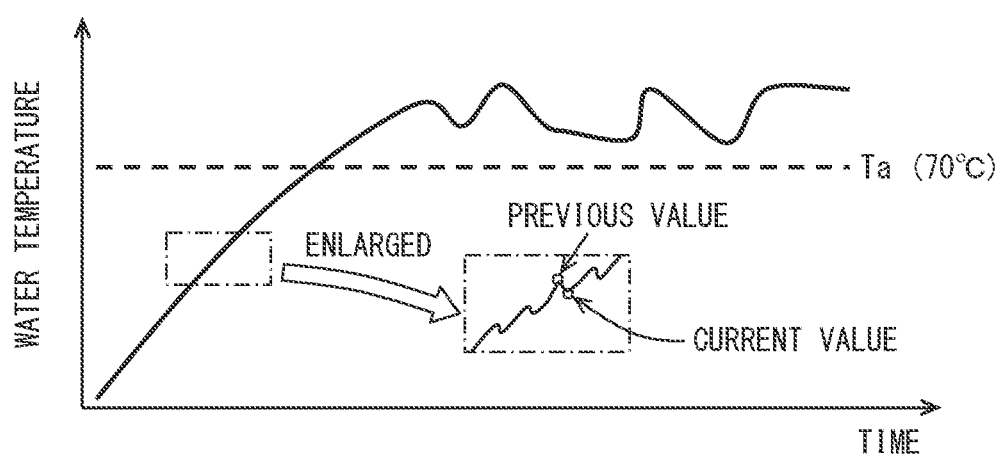
FIG. 11 is a diagram illustrating the water temperature change based on elapsed time.

If it is determined in S41 that the water temperature change amount does not exceed the normal change range, then, in S47, the process turns off the change amount abnormality flag and permits the estimated torque calculation by using the current value of the water temperature sensor 5. In S48, the process zeroes the count value updated in S43 to reset the abnormality state elapsed time. In S49, the process determines whether the current water temperature is lower than threshold value Ta (see FIG. 11). Threshold value Ta is set to 70° C., for example.

If it is determined that the current water temperature is lower than threshold value Ta, then, in S50, the process sets a water temperature used for the estimated torque calculation by using the current water temperature acquired in S23 or the previous water temperature, whichever is higher. If it is determined that the current water temperature is not lower than threshold value Ta, then, in S51, the process sets a water temperature used for the estimated torque calculation by using the current water temperature acquired in S23.

Figure 8:
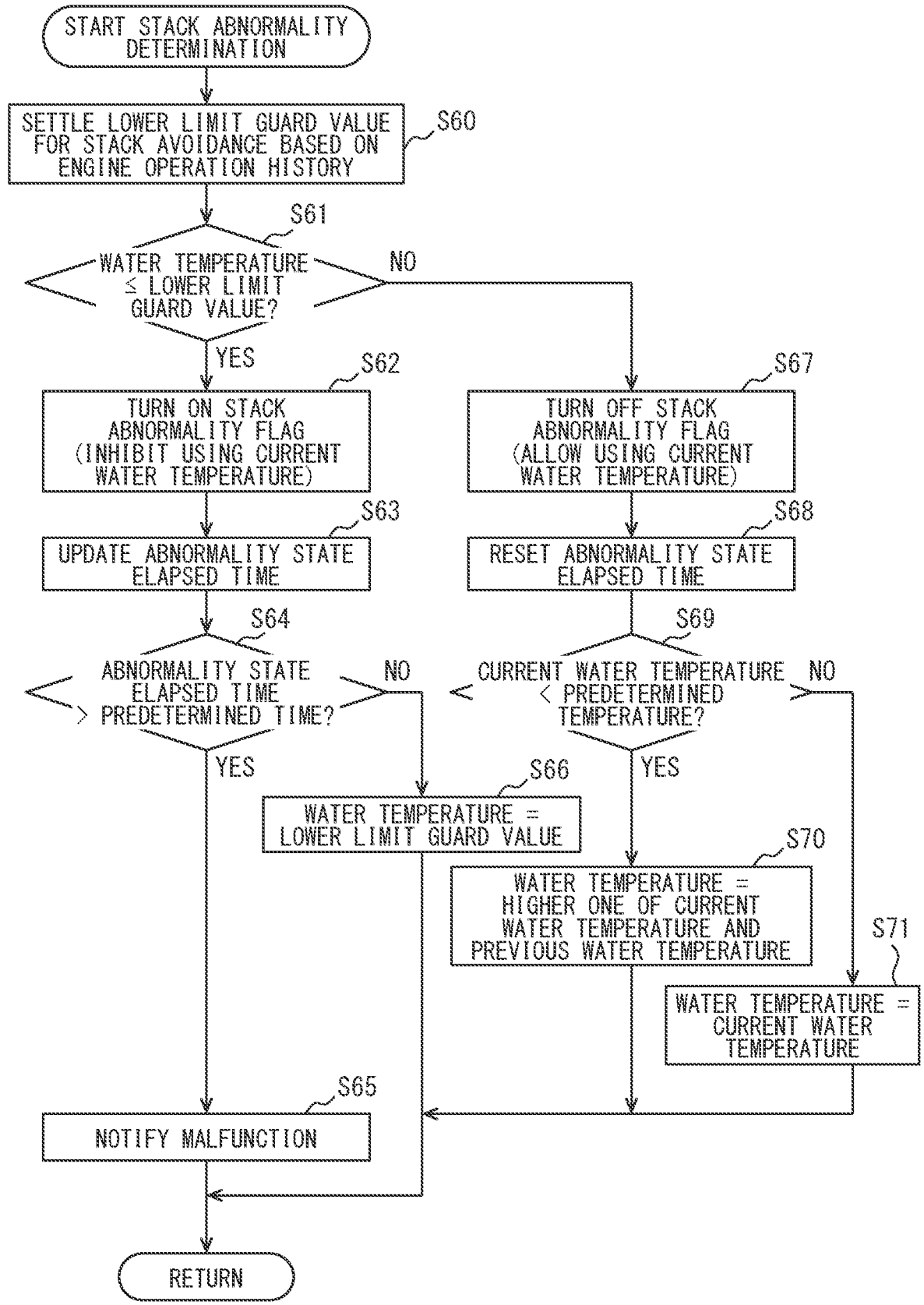
FIG. 8 is a flowchart illustrating a subroutine in FIG. 5, namely, a processing procedure of the stack abnormality determination.
Figure 10:
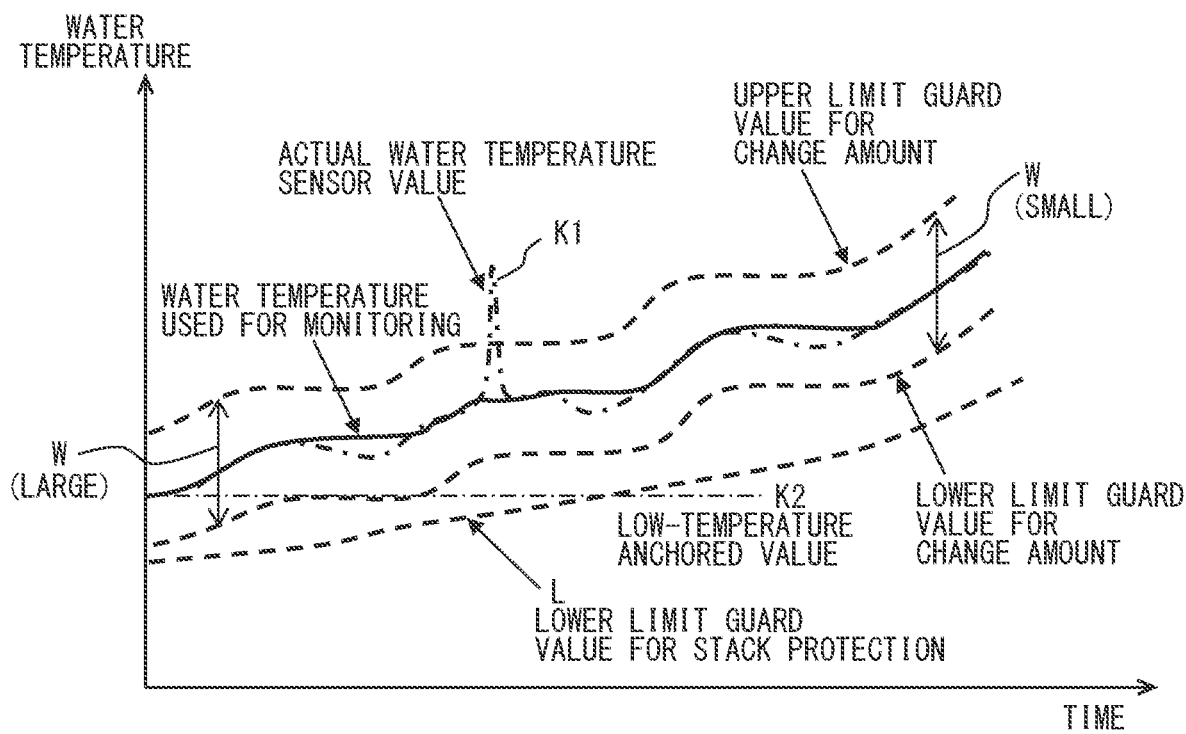
FIG. 10 is a diagram illustrating the relationship among a water temperature change, a normal change range, and a lower limit guard value for stack avoidance based on elapsed time.

FIG. 8 illustrates a stack abnormality determination process. In S60, the process sets a lower limit guard value for stack avoidance based on the operation history of the internal combustion engine. For example, when there is an abnormal state in which the water temperature sensor 5 continuously outputs a low-temperature value (low-temperature anchored value) lower than the actual water temperature though the water temperature sensor 5 is free from disconnection or short-circuiting, the lower limit guard value is that is set to be higher than the low-temperature anchored value. In FIG. 10, reference symbol L represents the lower limit guard value for stack avoidance and reference symbol K2 represents the low-temperature anchored value.

For example, the actual water temperature may be very low (such as −35° C.) when the internal combustion engine starts operating. Considering this, it is advantageous to decrease the lower limit guard value corresponding to a decrease in the water temperature and avoid inadvertently recognizing the normal state of the extremely low temperature to be the low-temperature anchored value. It is advantageous to increase the lower limit guard value corresponding to an increase in the water temperature and expedite the abnormality detection. In S60, the process decreases the lower limit guard value corresponding to an operation history of the internal combustion engine when the operation history indicates low water temperatures, for example.

Operation history parameters include the elapsed time after the internal combustion engine starts. The operation history parameters may include at least one of an engine speed, an intake air amount, a fuel cut state, a vehicle speed, a drive state of an air conditioner to air-condition inside the vehicle compartment, a drive state of a cooling system to cool the cooling water, an outside temperature to improve the accuracy of estimating the current water temperature.

In S61, the process determines whether the water temperature output from the water temperature sensor 5 is lower than or equal to the lower limit guard value that is set in S60. If it is determined that the water temperature is lower than or equal to the lower limit guard value, the water temperature sensor 5 is assumed to be likely to malfunction. Then, in S62, the process turns on a stack abnormality flag and inhibits the estimated torque calculation by using the current value of the water temperature sensor 5.

In S63, the process measures the elapsed time (abnormality state elapsed time) from the detection of the stack abnormality state. Specifically, the process starts incrementing a count value at the timing when the stack abnormality flag changes from the off-state to the on-state. In S63, the process increments the count value by 1 to update the count value.

In S64, the process determines whether the abnormality state elapsed time exceeds the specified time (malfunction determination period M). If it is determined that the specified time is exceeded, then, in S65, the process determines that the water temperature sensor 5 malfunctions. The result is output to the control module 20 and is output from the communication circuit 15 to the outside of the ECU 10. If it is determined that the abnormality state elapsed time does not exceed the specified time, then, in S66, the process sets a water temperature used for the estimated torque calculation by using the lower limit guard value, not the water temperature (current water temperature) based on the current voltage value acquired in S23.

If it is determined in S61 that the water temperature change amount is not lower than or equal to the lower limit guard value, then, in S67, the process turns off the stack abnormality flag and permits the estimated torque calculation by using the current value of the water temperature sensor 5. In S68, the process zeroes the count value updated in S63 to reset the abnormality state elapsed time. In S69, the process determines whether the current water temperature is lower than threshold value Ta.

If it is determined that the current water temperature is lower than threshold value Ta, then, in S70, the process sets a water temperature used for the estimated torque calculation by using the current water temperature acquired in S23 or the previous water temperature, whichever is higher. If it is determined that the current water temperature is not lower than threshold value Ta, then, in S71, the process sets a water temperature used for the estimated torque calculation by using the current water temperature acquired in S23.

Figure 9:
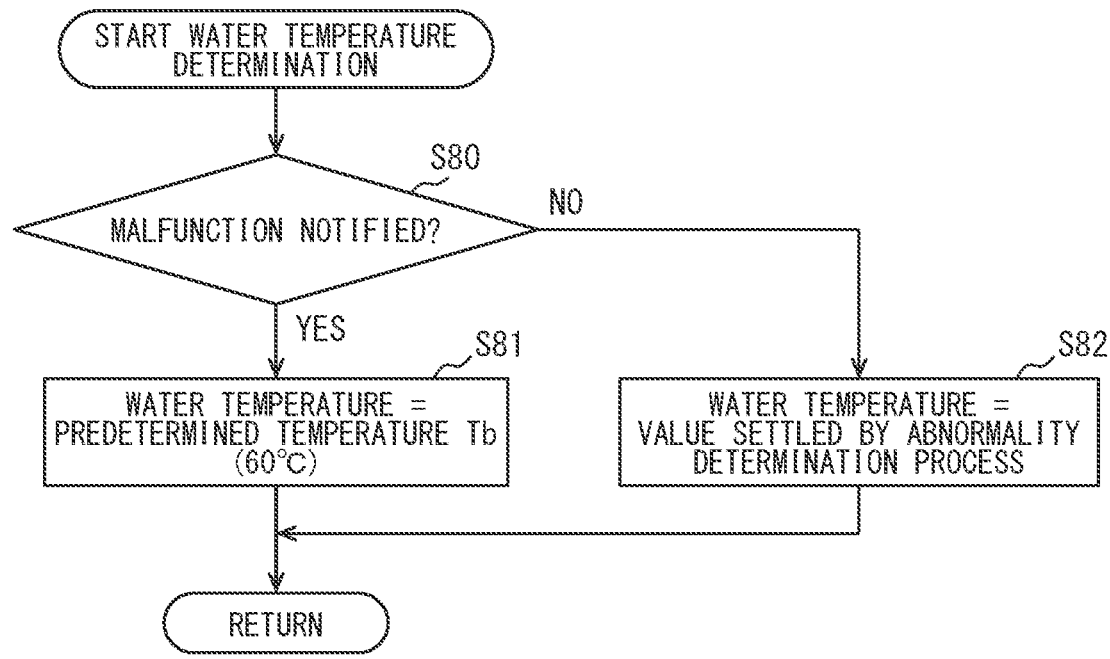
FIG. 9 is a flowchart illustrating a subroutine in FIG. 5, namely, a processing procedure of the water temperature determination.

FIG. 9 illustrates a water temperature determination process. In S80, the process determines whether the malfunction is notified from S34, S45, or S65. If it is determined that the malfunction is notified, then, in S81, the process sets a water temperature used for the estimated torque calculation by using predetermined temperature Tb (such as 60° C.). If it is determined that the malfunction is not notified, then, in S82, the process sets a water temperature used for the estimated torque calculation by using the value that is set by each of the abnormality determination processes in FIGS. 6, 7, and 8. Namely, the process sets a water temperature used for the estimated torque calculation by using the value that is set in any one of S35 and S38 in FIG. 6, S46, S50, and S51 in FIG. 7, and S66, S70, and S71 in FIG. 8.

As above, the loss torque calculation unit 33e of the monitor module 30 calculates a loss torque by using the water temperature that is set as above. The monitor module 30 calculates an estimated torque by using the loss torque and monitors a torque abnormality by using the estimated torque.

<5>One Aspect of Monitor Control

According to the present embodiment, as above, the loss torque calculation unit 33e of the monitor module 30 calculates the loss torque including the friction loss by using the current water temperature detected by the water temperature sensor 5. The monitor module 30 calculates an estimated torque by using the calculated loss torque and monitors a torque abnormality by using the estimated torque. The loss torque calculation unit 33e calculates a loss torque while inhibiting the use of the current water temperature detected by the water temperature sensor 5 during malfunction determination period M.

Figure 12:
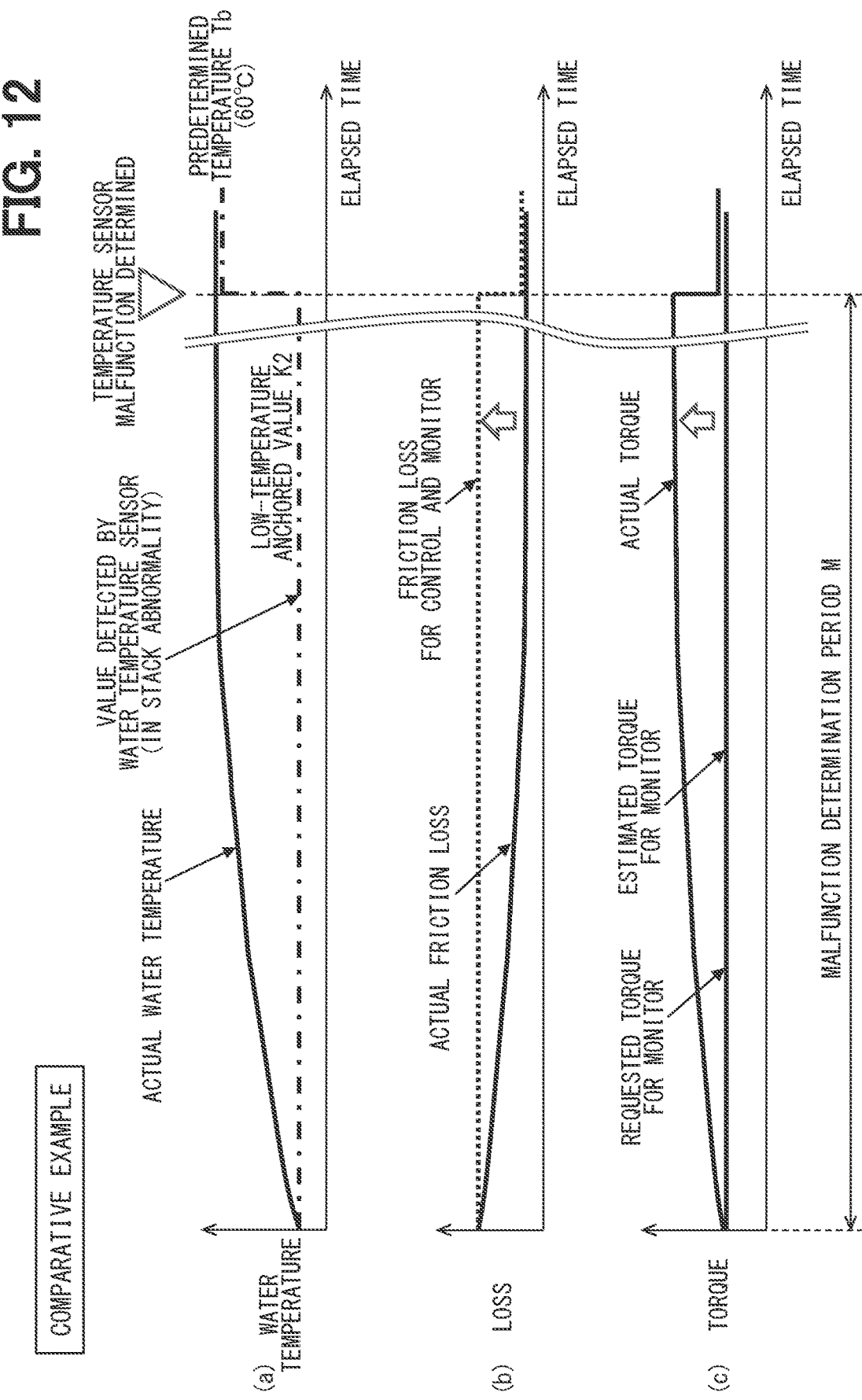
FIG. 12 is a diagram illustrating a water temperature change, a friction loss, and a torque change based on elapsed time according to a comparative example compared to the first embodiment.

A comparative example in FIG. 12 calculates a loss torque by using predetermined temperature Tb after completion of the malfunction determination. However, loss torque calculation unit 33e calculates a loss torque by using the current water temperature during malfunction determination period M. Namely, the current water temperature is used to calculate an estimated torque and monitor a torque abnormality. The friction loss calculation unit 21c of the control module 20 uses the current water temperature to calculate a friction loss according to the present embodiment and the comparative example.

Figure 13:
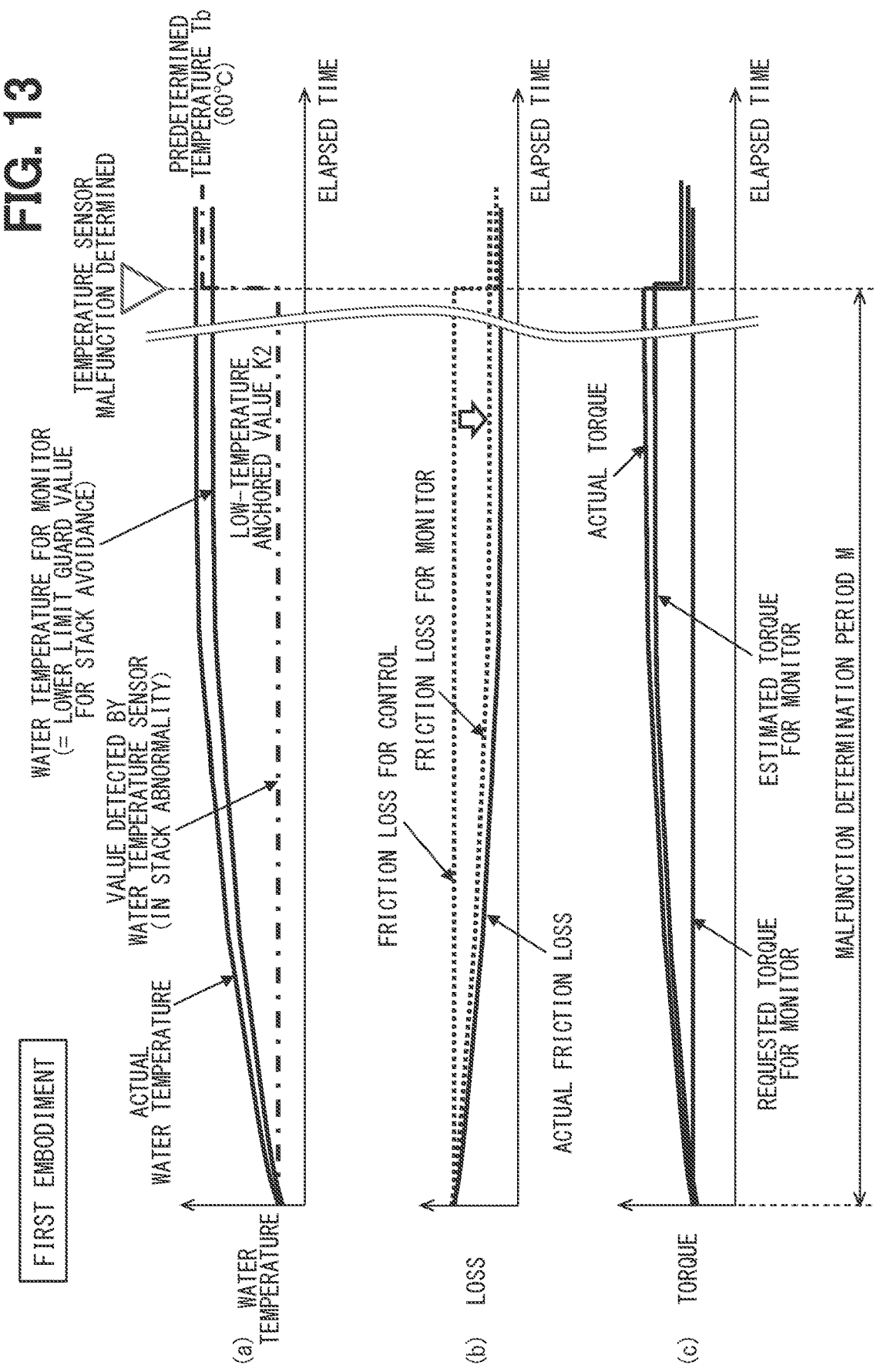
FIG. 13 is a diagram illustrating a water temperature change, a friction loss, and a torque change based on elapsed time according to the first embodiment.

Graphs (a), (b), and (c) of FIGS. 12 and 13 illustrate changes in the water temperature, the friction loss, and the torque based on the elapsed time. FIG. 12 illustrates the changes according to the comparative example. FIG. 13 illustrates the changes according to the present embodiment.

Graph (a) in FIG. 12 illustrates that a detection value of the water temperature sensor 5 remains the low-temperature anchored value because the water temperature sensor 5 is subject to a stack abnormality even though the actual water temperature increases after the internal combustion engine starts operating. The comparative example calculates a friction loss at the water temperature lower than the actual water temperature when the stack abnormality occurs.

Consequently, as illustrated in graph (b) of FIG. 12, a control-use friction loss calculated by the control module 20 is larger than the actual friction loss. As illustrated in graph (c) of FIG. 12, the actual torque is larger than a control-use engine-requested torque calculated by the control module 20. The actual torque remains larger than a targeted torque during malfunction determination period M.

As illustrated in graph (b) of FIG. 12, a monitor-use friction loss calculated by the monitor module 30 is larger than the actual friction loss due to the calculation at the low water temperature as above. As illustrated in graph (c) of FIG. 12, a monitor-use estimated torque calculated by the estimated torque operation portion 33 of the monitor module 30 is smaller than the actual torque. Therefore, a difference between the estimated torque and the monitor-use engine-requested torque calculated by the engine-requested torque operation portion 32 is not greater than or equal to a predetermined criterion. It is impossible to accurately monitor a torque abnormality.

According to the present embodiment, as illustrated in graph (a) of FIG. 13, a detection value of the water temperature sensor 5 remains the low-temperature anchored value. Even in this case, the water temperature used for calculation on the loss torque calculation unit 33e is set to the lower limit guard value that is set in S66 in FIG. 8 during malfunction determination period M. Therefore, a friction loss is calculated by use of the water temperature approximate to the actual water temperature compared to the case of using the low-temperature anchored value.

As a result, as illustrated in graph (b) of FIG. 13, the monitor module 30 calculates a monitor-use friction loss approximate to the actual friction loss compared to the control-use friction loss.

As illustrated in graph (c) of FIG. 13, the monitor-use estimated torque approximates to the actual torque compared to the comparative example. The estimated torque approximates to the actual torque when the actual torque remains larger than a targeted torque because the control-use friction loss is larger than the actual friction loss. A difference between the monitor-use engine-requested torque and the estimated torque is greater than or equal to the predetermined criterion. It is possible to accurately monitor a torque abnormality.

<6>Operation and Effect

The internal combustion engine control system according to the present embodiment includes the control module 20 (control unit), the monitor module 30 (monitor unit), and a detection abnormality determination unit based on S30, S41, and S61. The control module 20 controls combustion states of the internal combustion engine based on water temperature detection values from the water temperature sensor 5 (temperature sensor). The monitor module 30 calculates an estimated torque and an engine-requested torque and monitors whether the estimated torque differs from the engine-requested torque by an amount greater than or equal to a predetermined criterion. The detection abnormality determination unit determines whether the detected water temperature value or the behavior of the same is abnormal. The monitor module 30 includes a normal-state torque calculation unit based on S38, S51, and S71 and an abnormal-state torque calculation unit based on S35, S46, and S66. The normal-state torque calculation unit calculates an estimated torque by using the detected water temperature value when the detection abnormality determination unit determines no abnormality. The abnormal-state torque calculation unit inhibits using the detected water temperature value and calculates an estimated torque when the detection abnormality determination unit determines an abnormality.

The current water temperature is used to calculate an estimated torque used to monitor a torque abnormality when the water temperature sensor 5 is normal. In the normal state, the torque abnormality monitoring can take the water temperature into account, improving the monitoring accuracy. Meanwhile, an estimated torque is calculated without using the current water temperature detected by the water temperature sensor 5 during malfunction determination period M when the water temperature sensor 5 malfunctions. It is possible to improve the monitoring accuracy compared to the monitor using an abnormal value though the monitoring accuracy is lower than the same in the normal sensor state. Therefore, it is possible to monitor a torque abnormality during malfunction determination period M even if using the time (malfunction determination period M) enough to determine whether the water temperature sensor 5 malfunctions.

According to the present embodiment, the detection abnormality determination unit includes an upper and lower limit determination unit corresponding to S30 that determines an abnormality when the detected water temperature value exceeds a predetermined range between the upper and lower limits. It is possible to avoid monitoring a torque abnormality by use of the detected water temperature value that momentarily becomes abnormal due to noise, for example.

According to the present embodiment, the detection abnormality determination unit includes a change amount determination unit corresponding to S41 that determines an abnormality when the amount of change in the detected water temperature value exceeds the predetermined normal change range. It is also possible to avoid monitoring a torque abnormality by use of the detected water temperature value that momentarily becomes abnormal due to noise, for example.

The present embodiment increases the normal change range corresponding to a decrease in the detected water temperature value immediately before the change amount determination unit determines an abnormality. When the detected water temperature value abnormally changes from 10° C. to 50° C. (an increase of 40° C.) in 10 seconds, for example, the change amount determination unit can detect the abnormal state. However, a change from −30° C. to 10° C. (an increase of 40° C.) can occur and is highly likely to be normal. The present embodiment increases the normal change range corresponding to a decrease in the detected water temperature value immediately before the abnormality determination. Therefore, it is possible to avoid inadvertently recognizing the normal change state to be abnormal.

According to the present embodiment, the detection abnormality determination unit includes a lower limit guard determination unit corresponding to S61 that determines an abnormality when a detected water temperature value is smaller than or equal to the lower limit guard value. The lower limit guard value is set based on the operation state of the internal combustion engine. It is possible to avoid monitoring a torque abnormality based on the detected water temperature value that becomes abnormal and remains lower than the actual water temperature. The lubricating oil is assumed to be lowly viscous when a friction loss is calculated at the water temperature lower than the actual water temperature. The friction loss is calculated as being larger than actual. The engine-requested torque is calculated as being large.

According to the present embodiment, the lower limit guard determination unit sets the lower limit guard value based on the history of the operation state. The water temperature depends on the history of the operation state of the internal combustion engine. The history affects whether the detected water temperature value is abnormally small. The present embodiment sets the lower limit guard value based on the history of the operation state and can inhibit the possibility of identifying the state of normally detecting a low water temperature as being abnormal.

According to the present embodiment, the normal-state torque calculation unit calculates an estimated torque by using the most recently detected water temperature value or the previous value, whichever is larger. If a radiator cools the cooling water, the water temperature should linearly increase up to approximately 80° C. under a low-temperature condition. Strictly speaking, the water temperature should increase by pulsating as seen from an enlarged view of FIG. 11. The detected water temperature value corresponding to the falling part of the pulsation is highly likely to be lower than the actual water temperature. Considering this pulsation, the present embodiment uses the most recent value or the previous value, whichever is larger. It is possible to avoid incorrectly calculating a friction loss to be large by using the detected water temperature value (most recent value) corresponding to the falling part of the pulsation. The pulsation may cause the previous value to be higher than the actual water temperature. In this case, the friction loss is calculated to be small. The actual torque does not become larger than the user-requested torque due to the use of the previous value. The torque control and the torque abnormality monitoring use values that decrease the actual torque.

According to the present embodiment, the normal-state torque calculation unit calculates an estimated torque by using a value approximate to the higher temperature under the condition that the detected water temperature value indicates a low temperature lower than or equal to threshold value Ta. It is favorable to predetermine a range of the above-described linear increase and threshold value Ta as a boundary temperature corresponding to the end of the linear increase. It is possible to avoid the control or the monitor using a value to decrease the actual torque when the linear increase ends.

The present embodiment provides a malfunction determination unit corresponding to S33, S44, or S64 that determines the water temperature sensor 5 to malfunction when an abnormal state determined by the detection abnormality determination unit continues for a predetermined time or longer. When the malfunction determination unit determines the malfunction, the abnormal-state torque calculation unit calculates an estimated torque by recognizing the water temperature to be the predetermined temperature. It is possible to improve the calculation accuracy compared to the case of calculating an estimated torque without using the water temperature after malfunction determination period M during which the water temperature sensor 5 is determined to malfunction.

According to the present embodiment, the ECU 10 (internal combustion engine control system) includes the control module 20 (control-use arithmetic device) and the monitor module 30 (monitor-use arithmetic device). The control module 20 is provided as an arithmetic device that performs an arithmetic operation by using the control-use storage area 20m. The control module 20 arithmetically operates a target control amount as a target value of the control amount to control the combustion state of the internal combustion engine based on the user-requested torque. The monitor module 30 is provided as an arithmetic device that performs an arithmetic operation by using the monitor-use storage area 30m different from the control-use storage area 20m. The monitor module 30 includes a count value setup portion, an accumulation portion, and an abnormality determination unit. The monitor module 30 is provided as an arithmetic device to monitor the torque and performs an arithmetic operation by using the monitor-use storage area 30m different from the control-use storage area 20m. The monitor-use estimated torque becomes an abnormal value but the monitor-use requested torque does not become an abnormal value. Therefore, a torque difference increases. It is possible to monitor a torque abnormality due to an abnormality of data stored in the control-use storage area 20m.

The operation speed and accuracy are lowered for an estimated torque and a requested torque used for the monitor compared to an estimated torque and a requested torque used for the control. In consideration of this, the present embodiment allows an operation cycle of the monitor module 30 to be longer than an operation cycle of the control module 20. It is possible to avoid increasing an arithmetic processing load on the monitor module 30 more than necessary.

The request to secure the normality of data used for the torque operation is increased for an estimated torque and a requested torque used for the monitor compared to an estimated torque and a requested torque used for the control.

In consideration of this, the present embodiment provides the monitor module 30 with the input securing unit 31. The input securing unit 31 checks the normality of data acquired from outside the monitor module 30. It is possible to improve the reliability of securing the normality of data used for arithmetical operations on the monitor module 30 and respond to the above-described request.

Other Embodiments

The disclosure of this specification is not limited to the described embodiments. The disclosure includes the described embodiments and modified forms provided by those skilled in the art based on the embodiments. For example, the disclosure is not limited to combinations of the parts and/or elements described in the embodiments. The disclosure is available in various combinations. The disclosure can include an additional part that can be added to the embodiments. The disclosure includes an embodiment that is devoid of the parts and/or elements of the embodiments. The disclosure includes a replacement or a combination of the parts and/or elements between one embodiment and the other embodiment. The disclosed technical scope is not limited to the description of the embodiments. Some of the disclosed technical scopes need to be understood to be available in the description of the claims and to include all changes in the meaning and the scope comparable to the description of the claims.

In the first embodiment, the predetermined time (malfunction determination period M) is set to the same length in each of the malfunction determination units corresponding to S33, S44, and S64. Instead, the predetermined time may be set to different lengths for the malfunction determination units. Namely, malfunction determination period M may differ depending on types of abnormal states. For example, malfunction determination period M concerning stack abnormality may be longer than malfunction determination period M concerning change amount abnormality or voltage abnormality. The predetermined time concerning voltage abnormality may be shorter than the predetermined time concerning change amount abnormality. When an abnormal state occurs due to disconnection or short-circuiting, the voltage abnormality determination may promptly notify the malfunction.

In the first embodiment, the monitor module 30 performs the malfunction determination on the water temperature sensor 5. Instead, the control module 20 may perform the malfunction determination. Anything other than the control module 20 and the monitor module 30 may perform the malfunction determination. Each of the control module 20 and the monitor module 30 may perform the malfunction determination.

The first embodiment uses the water temperature sensor 5 as a temperature sensor to detect the temperature of a detection object. The engine cooling water is assumed to be the detection object. Instead, the temperature (oil temperature) of engine lubricating oil may be assumed to be the detection object. The temperature sensor may be replaced by an oil temperature sensor, an intake air temperature sensor to detect the intake air temperature, or a fuel temperature sensor to detect the fuel temperature.

According to the first embodiment, the detection abnormality determination unit includes the upper and lower limit determination unit corresponding to S30, the change amount determination unit corresponding to S41, and the lower limit guard determination unit corresponding to S61. Instead, the detection abnormality determination unit may just need to determine whether a detected water temperature value or the behavior of the same is abnormal. In this case, the detection abnormality determination unit may exclude the upper and lower limit determination unit, the change amount determination unit, and the lower limit guard determination unit or may eliminate some of the determination units.

According to the embodiments, the operation speed of the monitor module 30 is lower than the operation speed of the control module 20. Specifically, the bottleneck is a check processing speed of the input securing unit 31. The operation speeds of the engine-requested torque operation portion 32 and the estimated torque operation portion 33 are lower than the operation speed of the engine-requested torque calculation unit 21. Instead, the operation speed of the monitor module may be comparable to the operation speed of the control module 20.

According to the embodiments, the storage area of one shared memory 11m includes the control-use storage area 20m and the monitor-use storage area 30m. Instead, the ECU 10 may include a plurality of memories. A storage area of the first memory may be defined as the control-use storage area and a storage area of the second memory may be defined as the monitor-use storage area.

According to the embodiments, one shared MCU 11 includes the control-use storage area 20m and the monitor-use storage area 30m. Instead, the ECU 10 may include a plurality of MCUs. The first MCU may include the control-use storage area and the second MCU may include the monitor-use storage area.

According to the embodiments, the internal combustion engine mounted on a vehicle is assumed to be a control target of the ECU 10. Instead, the control target of the ECU 10 may include a stationary engine, not vehicle-mounted. The monitor target may include a vehicle-driving motor mounted on a hybrid vehicle or an electric vehicle.

What is claimed is:

1. An internal combustion engine control system comprising:
   a control unit configured to control a combustion state of an internal combustion engine based on a detection value of a temperature sensor that is configured to detect a temperature of a detection object;
   a monitor unit configured
      to calculate an estimated torque as an estimated value of an actual torque of the internal combustion engine and an engine-requested torque requested for the internal combustion engine and
      to monitor whether the estimated torque differs from the engine-requested torque by an amount greater than or equal to a predetermined criterion to be in an abnormal torque state; and
   a detection abnormality determination unit configured to determine whether one of the detection value and a behavior of the detection value is abnormal, wherein
   the monitor unit includes:
      a normal-state torque calculation unit configured to calculate the estimated torque by using the detection value when the detection abnormality determination unit does not determine an abnormality; and
      an abnormal-state torque calculation unit configured to calculate the estimated torque by inhibiting using of the detection value when the detection abnormality determination unit determines an abnormality, wherein
   the detection abnormality determination unit includes an upper and lower limit determination unit configured to determine an abnormality when the detection value exceeds a predetermined range between upper and lower limits, and
   the abnormal-state torque calculation unit is configured to:
      measure an abnormality state elapsed time that has elapsed from the determination of an abnormality by the upper and lower limit determination unit, and
      calculate the estimated torque while inhibiting using of the detection value on determination that the abnormality state elapsed time does not exceed a predetermined time.

2. The internal combustion engine control system according to claim 1, wherein
   the control unit is provided as a control-use arithmetic device configured to use a control-use storage area, and
   the monitor unit is provided as a monitor-use arithmetic device configured to use a monitor-use storage area different from the control-use storage area.

3. The internal combustion engine control system according to claim 2, wherein
   an operation cycle of the monitor-use arithmetic device is longer than an operation cycle of the control-use arithmetic device.

4. The internal combustion engine control system according to claim 2, wherein
   the monitor-use arithmetic device includes an input securing unit configured to check normality of data acquired from outside the monitor-use arithmetic device.

5. The internal combustion engine control system according to claim 1, wherein
   the monitor unit is configured to cause the abnormal-state torque calculation unit to calculate the estimated torque by using a previous detection value that is acquired before the determination of the abnormality, without using a current detection value that is currently acquired, on determination that the abnormality state elapsed time does not exceed the predetermined time.

6. The internal combustion engine control system according to claim 1, wherein
   the monitor unit is configured to cause the normal-state torque calculation unit to calculate the estimated torque by using the current detection value that is currently acquired, on determination by the upper and lower limit determination unit that the detection value does not exceed the predetermined range between upper and lower limits.

7. The internal combustion engine control system according to claim 1, wherein
   the monitor unit is configured to determine that the temperature sensor malfunctions and output a result of the determination that the temperature sensor malfunctions, on determination that the abnormality state elapsed time has exceeded the predetermined time.

* * * * *